(12) United States Patent
Bonen et al.

(10) Patent No.: US 10,558,570 B2
(45) Date of Patent: Feb. 11, 2020

(54) CONCURRENT ACCESSES OF ASYMMETRICAL MEMORY SOURCES

(71) Applicant: Intel Corporation, Santa Clara, CA (US)

(72) Inventors: Nadav Bonen, Ofer (IL); Zvika Greenfield, Kfar Sava (IL); Randy Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/442,470

(22) Filed: Feb. 24, 2017

(65) Prior Publication Data
US 2017/0300415 A1     Oct. 19, 2017

Related U.S. Application Data

(60) Provisional application No. 62/308,210, filed on Mar. 14, 2016.

(51) Int. Cl.
*G06F 12/00*     (2006.01)
*G06F 12/0831*   (2016.01)
(Continued)

(52) U.S. Cl.
CPC ...... *G06F 12/0835* (2013.01); *G06F 12/0871* (2013.01); *G06F 13/1642* (2013.01);
(Continued)

(58) Field of Classification Search
CPC ............ G06F 12/0835; G06F 13/1678; G06F 12/0871; G06F 13/1642; G06F 2212/621; G06F 2212/6042
See application file for complete search history.

(56) References Cited

U.S. PATENT DOCUMENTS 4,794,521 A  * 12/1988 Ziegler ................. G06F 12/084
                                                    711/130
6,272,594 B1 *  8/2001 Gupta .................. G06F 12/0607
                                                    711/127
(Continued)

OTHER PUBLICATIONS

International Search Report and Written Opinion for PCT Patent Application No. PCT/US2017/021040, dated May 24, 2017, 16 pages.

*Primary Examiner* — Tasnima Matin
(74) *Attorney, Agent, or Firm* — Compass IP Law, PC

(57) ABSTRACT

Described herein are embodiments of asymmetric memory management to enable high bandwidth accesses. In embodiments, a high bandwidth cache or high bandwidth region can be synthesized using the bandwidth capabilities of more than one memory source. In one embodiment, memory management circuitry includes input/output (I/O) circuitry coupled with a first memory and a second memory. The I/O circuitry is to receive memory access requests. The memory management circuitry also includes logic to determine if the memory access requests are for data in a first region of system memory or a second region of system memory, and in response to a determination that one of the memory access requests is to the first region and a second of the memory access requests is to the second region, access data in the first region from the cache of the first memory and concurrently access data in the second region from the second memory.

16 Claims, 12 Drawing Sheets

(51) Int. Cl.
*G06F 12/0871* (2016.01)
*G06F 13/16* (2006.01)

(52) U.S. Cl.
CPC .. *G06F 13/1678* (2013.01); *G06F 2212/6042* (2013.01); *G06F 2212/621* (2013.01)

(56) References Cited

U.S. PATENT DOCUMENTS

| | | | | |
|---|---|---|---|---|
| 6,397,292 | B1* | 5/2002 | Venkatesh | G06F 11/2069 711/113 |
| 2005/0038961 | A1* | 2/2005 | Chen | G06F 12/0884 711/118 |
| 2005/0078696 | A1* | 4/2005 | Oner | G06F 12/0804 370/419 |
| 2005/0216667 | A1* | 9/2005 | Cabot | G06F 12/0802 711/118 |
| 2009/0106478 | A1* | 4/2009 | Okin | G06F 11/1658 711/1 |
| 2009/0228656 | A1* | 9/2009 | Borkenhagen | G06F 12/0864 711/118 |
| 2010/0235578 | A1* | 9/2010 | Sih | G06F 12/08 711/122 |
| 2011/0316865 | A1* | 12/2011 | Soma | G06F 13/385 345/520 |
| 2013/0275682 | A1* | 10/2013 | Ramanujan | G06F 13/1684 711/122 |
| 2013/0332668 | A1* | 12/2013 | Diep | G06F 12/0864 711/105 |
| 2014/0208020 | A1* | 7/2014 | Benhase | G06F 12/0246 711/113 |
| 2015/0227469 | A1* | 8/2015 | Zyulkyarov | G06F 12/0895 711/207 |

\* cited by examiner

METHOD IN A SYSTEM WITH AT LEAST TWO
MEMORY SOURCES, INCLUDING A FIRST AND
SECOND MEMORY
600A

FIG. 6A

RECEIVE MEMORY ACCESS REQUESTS FOR
DATA STORED IN THE SECOND MEMORY
(E.G., SYSTEM MEMORY)
602

↓

DETERMINE WHETHER THE MEMORY
ACCESS REQUESTS ARE TO A CACHEABLE
OR NON-CACHEABLE REGION
603

↓

ACCESS TO A CACHEABLE REGION?
604
— NO →
— YES ↓

DETERMINE WHETHER THERE IS A CACHE HIT
605

↓

CACHE HIT?
606
— NO →
— YES ↓

ACCESS DATA FROM THE FIRST MEMORY
(E.G., FROM CACHE)
608

ACCESS DATA FROM THE SECOND MEMORY
(E.G., FROM SYSTEM MEMORY)
610

CONCURRENT ACCESSES USING BANDWIDTH OF
BOTH THE FIRST MEMORY AND THE SECOND
MEMORY

ACCESS THE DATA FROM THE SECOND MEMORY
612

↓

COPY DATA TO THE CACHE IN THE FIRST MEMORY
614

CONCURRENT ACCESSES OF ASYMMETRICAL MEMORY SOURCES

RELATED APPLICATIONS

This patent application is a nonprovisional application based on, and claims the benefit of priority of, U.S. Provisional Application No. 62/308,210, filed Mar. 14, 2016. The provisional application is hereby incorporated by reference.

FIELD

Embodiments of the invention are generally related to memory devices, and more particularly to the management of memories to enable high bandwidth access.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2017, Intel Corporation, All Rights Reserved.

BACKGROUND

Memory devices are ubiquitous in computing devices to store data and code for a processor to execute operations and accomplish the functioning of computing devices. Even as the demand for computing devices grows, there is a trend towards smaller computing devices that operate on less power, especially in mobile devices. As mobile computing devices have increased in computational performance, they have included more and more storage and memory to meet the growing processing and execution performed on the devices. Additionally, some applications can require memory with a high bandwidth.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIGS. 6A and 6B are flow diagrams of methods of managing multiple memory sources to enable high bandwidth access, in accordance with embodiments.

Figure 1:
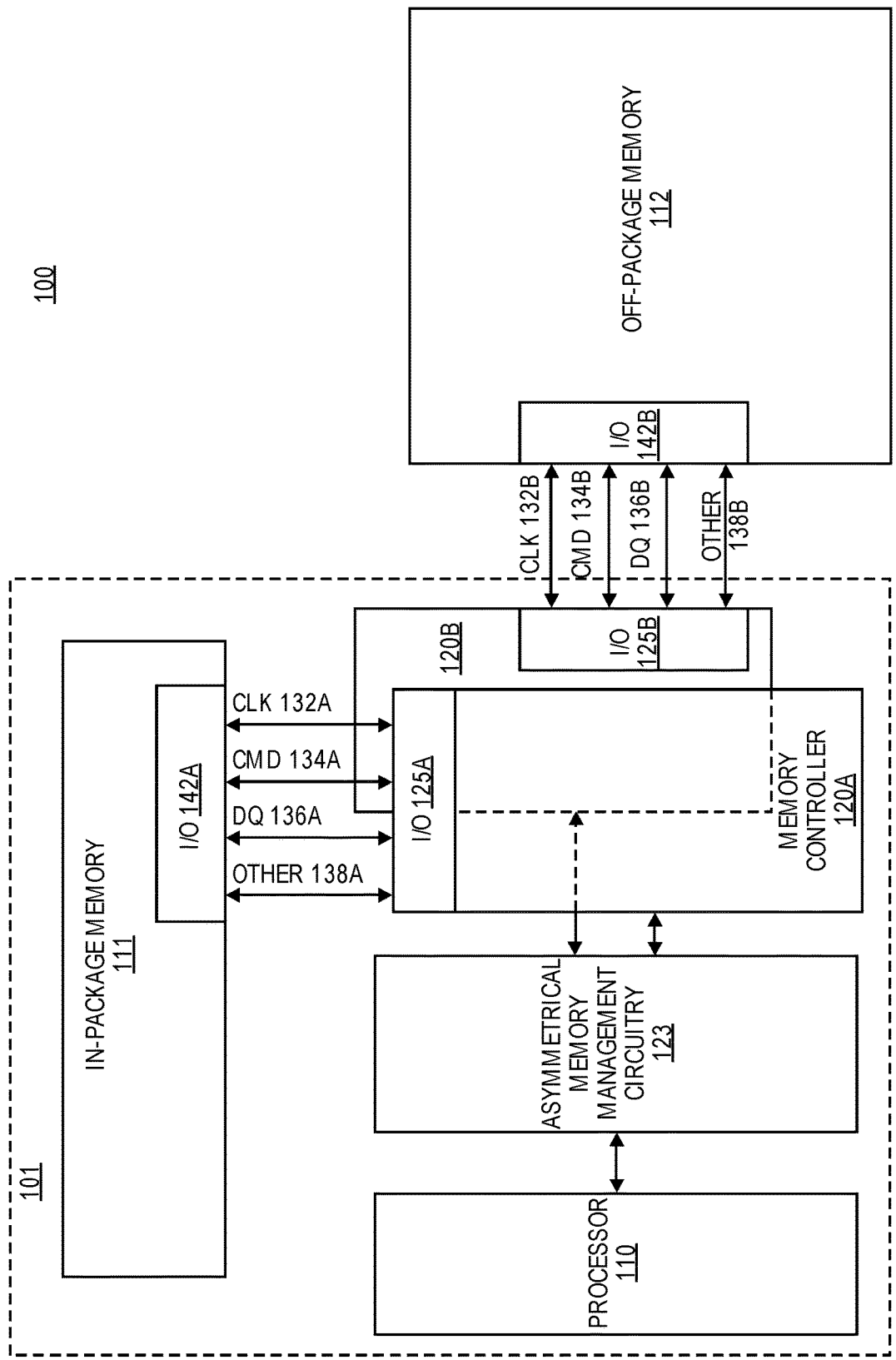
FIG. 1 is a block diagram of an embodiment of a system in which an asymmetrical memory management circuit can be implemented.

Descriptions of certain details and implementations follow, including a description of the figures, which may depict some or all of the embodiments described below, as well as discuss other potential embodiments or implementations of the inventive concepts presented herein.

DETAILED DESCRIPTION

As mentioned briefly above, some applications can require a memory with high bandwidth. For example, integrated graphics can benefit from memory that has a higher bandwidth than typical memory.

Adding more memory channels is one way to provide more bandwidth. However, additional memory channels on the motherboard can significantly increase the size of the product form factor. Additionally, adding memory channels can result in undesirable packaging solutions (e.g., by increasing the number of pins on the memory package and the package housing the processor).

One approach to increasing memory bandwidth is to use in-package memory (IPM), which can also be referred to as on-package memory. In-package memory is memory that is located or integrated in the same package or die as a processor, or other processing circuitry such as an application-specific integrated circuit (ASIC) or field-programmable gate array (FPGA). The following description generally refers to an in-package memory as memory that is located in the same package as a processor, however, the descriptions also apply to embodiments in which the in-package memory is located in the same package as an ASIC, FPGA, or other processing circuitry that accesses memory.

By integrating memory in the same package as the processor, the in-package memory and processor can be located closer to one another than in traditional systems, which enables reducing the length of the signal lines between the memory and processor. Reducing the length of the signal lines between the memory and processor can enable increased bandwidth (e.g., due to wider data bus and data bus interfaces, higher operating frequency, or both), as well as enable a smaller package size and reduced power consumption.

Different uses of in-package memory can require different capacities and bandwidth capabilities. It can be a challenge to find a solution that provides sufficient bandwidth for applications requiring high bandwidth, and capacity that is sufficient but not excessive, while also keeping the cost of the device low.

In one embodiment, logic in the SoC (system on a chip) can synthesize a high bandwidth cache, a high bandwidth region of memory, or otherwise enable high bandwidth memory accesses by accessing data across both an in-package and off-package memory concurrently. Thus, embodiments enable memory accesses at a bandwidth that is the aggregate bandwidth of both memories, and thus greater than the bandwidth of the in-package or off-package memories individually. Additionally, in one embodiment, logic in the SoC can allocate some capacity of an in-package memory to system memory (as opposed to being used exclusively as a hardware cache, for example), which can enable excess capacity of an in-package memory to contribute to system memory rather than be underutilized.

FIG. 1 is a block diagram of a system in which asymmetrical memory management can be implemented, in accordance with embodiments.

System 100 includes elements of a memory subsystem in a computing device. Processor 110 represents a processing unit of a host computing platform that executes an operating system (OS) and applications, which can collectively be referred to as a "host" for the memory. The OS and applications execute operations that result in memory accesses. Processor 110 can include one or more separate processors. Each separate processor can include a single and/or a multicore processing unit. The processing unit can be a primary processor such as a CPU (central processing unit) and/or a peripheral processor such as a GPU (graphics processing unit). System 100 can be implemented as a system on a chip (SoC) 101. Some components may be implemented as standalone components.

Memory controllers 120A and 120B represent memory controller circuits or devices for system 100. Memory controllers 120A and 120B represent control logic that generates memory access commands in response to the execution of operations by processor 110. If a something (e.g., "x") occurs "in response to" another event (e.g., "y"), x can be directly or indirectly in response to y. For example, the occurrence of y can eventually result in the occurrence of x, but there may be other intermediate events and/or conditions. In other scenarios, y may not necessarily result in the occurrence of x, and x may occur even though y has not occurred. Furthermore, "in response to" does not exclude the existence of additional and/or different causative events. Thus, the term "in response to" can also mean "at least partially in response to." Memory controllers 120A and 120B access one or more memory devices. In the illustrated embodiment, the memory controller 120A is coupled with and accesses memory 111, and the memory controller 120B is coupled with and accesses the memory 112. In the illustrated embodiment, the memory 111 is an in-package memory (IPM), which can also be referred to as an on-package memory. As mentioned above, an in-package memory is a memory that is located or integrated in the same package or die as a processor. The memory 112 is illustrated as being an off-package memory. An off-package memory is located in a package separate from a processor. In one embodiment, the off-package memory 112 is disposed directly on a motherboard or host system platform (e.g., a printed circuit board (PCB) on which processor 110 is disposed) of a computing device. Thus, in the illustrated example, the in-package memory 111 is in the same package as the processor 110, and the off-package memory 112 is located in a package that is separate from the processor 110.

As noted above, the memories 111 and 112 can include different memory types. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). DRAM that is in-package can be an embedded DRAM (eDRAM). A memory subsystem as described herein may be compatible with a number of memory technologies, such as DDR3 (dual data rate version 3, original release by JEDEC (Joint Electronic Device Engineering Council) on Jun. 27, 2007, currently on release 21), DDR4 (DDR version 4, initial specification published in September 2012 by JEDEC), LPDDR3 (low power DDR version 3, JESD209-3B, August 2013 by JEDEC), LPDDR4 (LOW POWER DOUBLE DATA RATE (LPDDR) version 4, JESD209-4, originally published by JEDEC in August 2014), LPDDR5 (LOW POWER DOUBLE DATA RATE (LPDDR) version 5, currently in discussion by JEDEC), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory may be byte or block addressable. Block addressable or byte addressable nonvolatile memory may include, but are not limited to, 3-Dimensional crosspoint memory, memory that use chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types. Descriptions herein referring to a "DRAM" can apply to any memory device that allows random access, whether volatile or nonvolatile. The memory device or DRAM can refer to the die itself and/or to a packaged memory product.

Memory controller 120A includes Input/Output (I/O) interface logic 125A to couple to a system bus between the memory controller 120A and the in-package memory 111. Similarly, the memory controller 120B includes I/O interface logic 125B to couple to a system bus between the memory controller 120B and the off-package memory 112. I/O interface logic 125A-125B (as well as I/O interface logic 142A and 142B of the memories 111 and 112, respectively) can include pins, connectors, signal lines, and/or other hardware to connect the devices. I/O interface logic 125A-125B can include a hardware interface. Typically, wires within an integrated circuit couple with a pad or connector to interface signal lines or traces between devices. I/O interface logic 125A-125B can include drivers, receivers, transceivers, termination, and/or other circuitry to send and/or receive signals on the signal lines between the devices. The system bus can be implemented as multiple signal lines coupling memory controllers 120A and 120B to the memory devices 11 and 112, respectively. The system bus includes at least clock (CLK) (e.g., 132A and 132B), command/address (CMD) (e.g., 134A and 134B), data (DQ) (e.g., 136A and 136B), and other signal lines (e.g., 138A and 138B). The signal lines for CMD 134A-134B can be referred to as a "C/A bus" (or ADD/CMD bus, or some other designation indicating the transfer of commands and address information). The signal lines for DQ 136A-136B can be referred to as a "data bus." In one embodiment, independent channels have different clock signals, C/A buses, data buses, and other signal lines. Thus, system 100 can be considered to have multiple "system buses," in the sense that an independent interface path can be considered a separate system bus. It will be understood that in addition to the lines explicitly shown, a system bus can include strobe signaling lines, alert lines, auxiliary lines, and other signal lines.

It will be understood that the system bus includes data buses (DQ) configured to operate at a bandwidth. Based on design and/or implementation of system 100, DQ 136A and 136B can have more or less bandwidth per memory device. For example, DQ can support memory devices that have either a x32 interface, a x16 interface, a x8 interface, or other interface. The convention "xN," where N is a binary integer refers to an interface size of memory device, which represents a number of signal lines DQ that exchange data with memory controllers 120A-120B. The interface size of the memory devices is a controlling factor on how many memory devices can be used concurrently per channel in system 100 or coupled in parallel to the same signal lines. The term "coupled" can refer to elements that are physically, electrically, and/or communicably connected either directly or indirectly, and may be used interchangeably with the term "connected" herein.

In some embodiment, the in-package memory 111 operates at a higher bandwidth than the off-package memory 112. The bandwidth of the memories is typically determined based on the width of the interface (e.g., the number of DQ pins in the interface), the frequency or speed at which the memory is operated, or both. For example, some systems include in-package memory that has a wider interface than the off-package memory 112. Including memories with wider interfaces in-package can be less expensive and simpler than for memories off-package due to, for example, the proximity of the memory to the memory controller, which can affect the complexity and length of signal lines between the memory and memory controller. Additionally, in-package memories can be coupled with other circuitry in the SoC via traces and without requiring pins. In-package memories may also be run at higher speeds than off-package memories due to, for example, the shorter length of the signal lines to the in-package memory being more conducive to high frequency operation. Thus, in some embodiments, the in-package memory has a higher bandwidth than the off-package memory. However, embodiments are not limited to systems with a higher bandwidth in-package memory and a lower bandwidth off-package memory. Embodiments can include multiple memory sources, any of which can be in-package or off-package, and which can have the same or different bandwidths.

In one embodiment, a memory device (such as the memory 111 or 112) is a separate memory die, which can include multiple (e.g., 2 or more) channels per die. The in-package memory 111 and off-package memory 112 include I/O interface logic 142A and 142B respectively, which has a bandwidth determined by the implementation of the device (e.g., x16 or x8 or some other interface bandwidth). I/O interface logic 142A and 142B enables the memory devices to interface with respective memory controllers 120A and 1206. I/O interface logic 142B can include a hardware interface, and can be in accordance with I/O 125A and 125B of the memory controllers, but at the memory device end. In one embodiment, the in-package memory 111 or the off-package memory can include multiple memory devices connected in parallel to the same data buses. For example, system 100 can be configured with multiple off-package memory devices 112 coupled in parallel, with each memory device responding to a command, and accessing memory resources internal to each device.

Referring again to the memories 111 and 112, in-package memory is typically smaller in capacity than off-package memory, and as mentioned above, may have higher bandwidth capabilities. Typically, a system with both in-package memory and off-package memory will operate the faster in-package memory as a cache and use the larger off-package memory as system memory. System memory is memory that is available for use in operation of the system, and can also be referred to as main memory. For example, system memory can store data, including instructions for execution by a processor and data accessed and/or manipulated as a result of execution of instructions.

As mentioned above, off-package memory is typically used as system memory and in-package memory is typically used exclusively as a cache. However, due to differing bandwidth and capacity requirements, such configurations can have disadvantages. For example, consider some options for providing in-package memory, such as an embedded DRAM (eDRAM), a custom-designed memory device, or a high volume memory device. Embedded DRAM can in some cases provide a high bandwidth, high bandwidth efficiency, and small footprint, but may not provide sufficient capacity for some applications. A custom or non-mainstream DRAM could be designed to meet the capacity and bandwidth needs for a specific application. However, custom DRAMs can be prohibitively expensive due to low production volumes. Another option to provide greater capacity in-package memory is to employ high volume devices (or small modulations from the high volume devices). High volume devices are devices that are produced in high volumes (as opposed to custom DRAMs that are produced at low volumes due to, for example, a smaller market for the custom DRAMs). One example of a high volume device is a DRAM device in compliance with a standard such as LPDDR5 or another standard. Employing high volume devices can enable benefiting from volume pricing. However, some high volume devices have a relatively low bandwidth to capacity ratio, which can require using many devices to attain the bandwidth target. The cost of using many devices can be prohibitively high. Furthermore, the capacity of the in-package memory when using enough high volume devices to achieve the desired bandwidth may be higher than necessary for some applications. Thus, the capacity and cost of an in-package memory using high volume devices can be higher than necessary.

In accordance with embodiments, the SoC 101 also includes asymmetrical memory management circuitry 123 to enable high bandwidth memory accesses, and in some embodiments can enable flexibility in how the capacity of the memories 111 and 112 is used. The references herein to "asymmetrical memory" typically refer to memory sources that are asymmetrical in terms of capacity, bandwidth, or both capacity and bandwidth. For example, a small in-package memory and a larger off-package memory can be asymmetrical in terms of size. However, the asymmetrical memory management referred to herein applies equally to multiple memory sources that are symmetrical in terms of capacity, bandwidth, or both. A "memory source" (or simply "memory") can include one or more memory devices. For example, in the example where a memory source is off-package memory, off-package memory can include one or more DIMMs, each of which can include one or more memory die or devices. The asymmetrical memory management circuitry 123 is communicatively coupled with the processor 110 and the memory controllers 120A and 120B. The asymmetrical memory management circuitry 123 receives memory requests from the processor 110 and directs requests to the appropriate memory controllers 120A and 120B.

In one embodiment, the asymmetrical memory management circuitry 123 includes logic to dynamically cache a portion of highly used memory to the in-package memory 111. The cache can be inclusive (e.g., if data is cached in the cache of the in-package memory, it can also be present in another level of cache) or exclusive (e.g., if data is cached in the cache of the in-package memory, it is not present in another level of cache). The cache only caches data from certain predefined regions of system memory, in accordance with embodiments. For example, system memory can include one or more regions that are "cacheable" and one or more regions that are "non-cacheable." For example, in one embodiment, accesses to a "cacheable" region of system memory can result in the data in that region being copied to an in-package memory cache, whereas accesses to the "non-cacheable" region do not result in the data being copied to the in-package memory. In one embodiment, the ratio of the size of cacheable regions to non-cacheable regions is proportional to the ratio of the bandwidths of the memories 111 and 112. For example, given a 4 kB (kilobyte) OS (operating system) page and memories with equal bandwidths, 2 kB of a 4 kB page are cacheable, in accordance with an embodiment. Thus, in one such example, each 4 kB page includes 2 kB that are cacheable and 2 kB that are not cacheable. In one embodiment, only an "upper" portion or region (e.g., an upper 2 kB) of a given page is cacheable, and the "lower" portion (e.g., a lower 2 kB) is non-cacheable, or vice versa. The logic can then split or route system address traffic to "non-cacheable addresses" which reside in the off-package memory 112 and "cacheable addresses" which can be cached on the in-package memory. For example, the asymmetrical memory management circuitry 123 can determine if a given access is to non-cacheable region (e.g., address is a lower part of a 4 kB page) or to a cacheable region (e.g., the address is an upper part of the 4 kB page) by performing, for example, a hash function. If the result of the hash function indicates that the access is to a non-cacheable region, the asymmetrical memory management circuitry 123 routes the request to the off-package memory, in accordance with an embodiment. If the result of the hash function indicates that an access is to a cacheable region, the asymmetrical memory management circuitry 123 checks to see if there is a cache hit or miss. If there is a cache hit, the asymmetrical memory management circuitry 123 routes the request to the in-package memory.

The logic can thus interleave addresses across an aggregate of memory channels of the in-package memory and the off-package memory. Therefore, a cache can be synthesized from both the in-package memory 111 and the off-package memory in the sense that cached data can be accessed from the cache of the in-package memory at the same time data is accessed from the off-package memory, in accordance with embodiments. Referring again to the example above of a 4 kB page, a cache line from the upper 2 kB of the page can be accessed from the in-package memory and a cache line from the lower 2 kB can be concurrently accessed from the off-package memory, resulting in an access for data in the page at a bandwidth that is twice the bandwidth of the memories individually. Accesses to memory are concurrent or simultaneous if the accesses occur substantially at the same time. For example, if memory commands are transmitted to a memory controller or memory device at substantially the same time, the accesses are concurrent.

Note that such a cache synthesized from both in-package and off-package memories is different than typical cache designs or a cache pre-fetching mechanism. Existing systems access the cache first, and if there is a miss, go to system memory to access the desired data. In contrast, embodiments of the invention, a portion of data (e.g., a cache line in a page) is retrieved from the cache and at the same time another portion of data (e.g., another cache line in the same page) is retrieved from system memory, which enables using the aggregate of memory channels of both memories. Because the aggregate of memory channels of both memories 111 and 112 can be used concurrently to access data, the bandwidth for such an access is higher (e.g., double) than the bandwidth of the in-package memory 111 or the off-package memory 112 individually. However, accessing a portion of cached data from the off-package memory (rather than accessing all the cached data from the in-package memory) can increase the latency of accessed cached data in cases where the off-package memory has a very high latency. Therefore, applications that are highly latency-sensitive may not be able to use the synthesized high bandwidth cache described herein.

In one embodiment, the asymmetrical memory management circuitry 123 can also (or alternatively) include logic to statically allocate system memory between the in-package memory 111 and the off-package memory 112. For example, off-package memory can be mapped to the low physical address space and the in-package memory to the physical address space above it, or vice versa. Unlike existing systems that use an in-package memory as a cache only and the off-package memory for system memory only, data can be stored in system memory across both the in-package memory and the off-package memory, and therefore accessed simultaneously using the interfaces of both memories. By accessing data simultaneously using both interfaces, the bandwidth of both memories can be used simultaneously for a given access. Thus, given data can be stored across both the in-package and off-package memory, and therefore accessed concurrently using both the interface of the in-package memory and the off-package memory.

In one embodiment, the asymmetrical memory management circuitry 123 can also (or alternatively) include logic to synthesize a high bandwidth memory region for traffic requiring high bandwidth. For example, logic can allocate a region of both the in-package and off-package memories for a high bandwidth region that is visible to the OS (Operating System), drivers, or both. The operating system (e.g., via a software memory manager) can allocate pages of memory that require high bandwidth in the high bandwidth region across both the in-package and off-package memories. A combination of approaches is also possible. For example, the in-package memory 111 can have a region allocated for a cache, a region allocated for a high-bandwidth region that is visible to the OS, and/or system memory can be allocated across both the in-package and off-package memories.

Thus, embodiments can enable a portion of the in-package memory capacity to contribute to increasing the memory bandwidth (e.g., via a synthesized high bandwidth cache or other high bandwidth region) and the remaining portion of the in-package memory capacity to contribute to overall system memory capacity (e.g., via static allocation of system memory across both the in-package and off-package memories). Thus, in accordance with embodiments, the asymmetrical memory management circuitry 123 can enable high bandwidth memory accesses using high volume memory devices, while also taking advantage of the capacity increase by using excess capacity for system memory.

Figure 2:
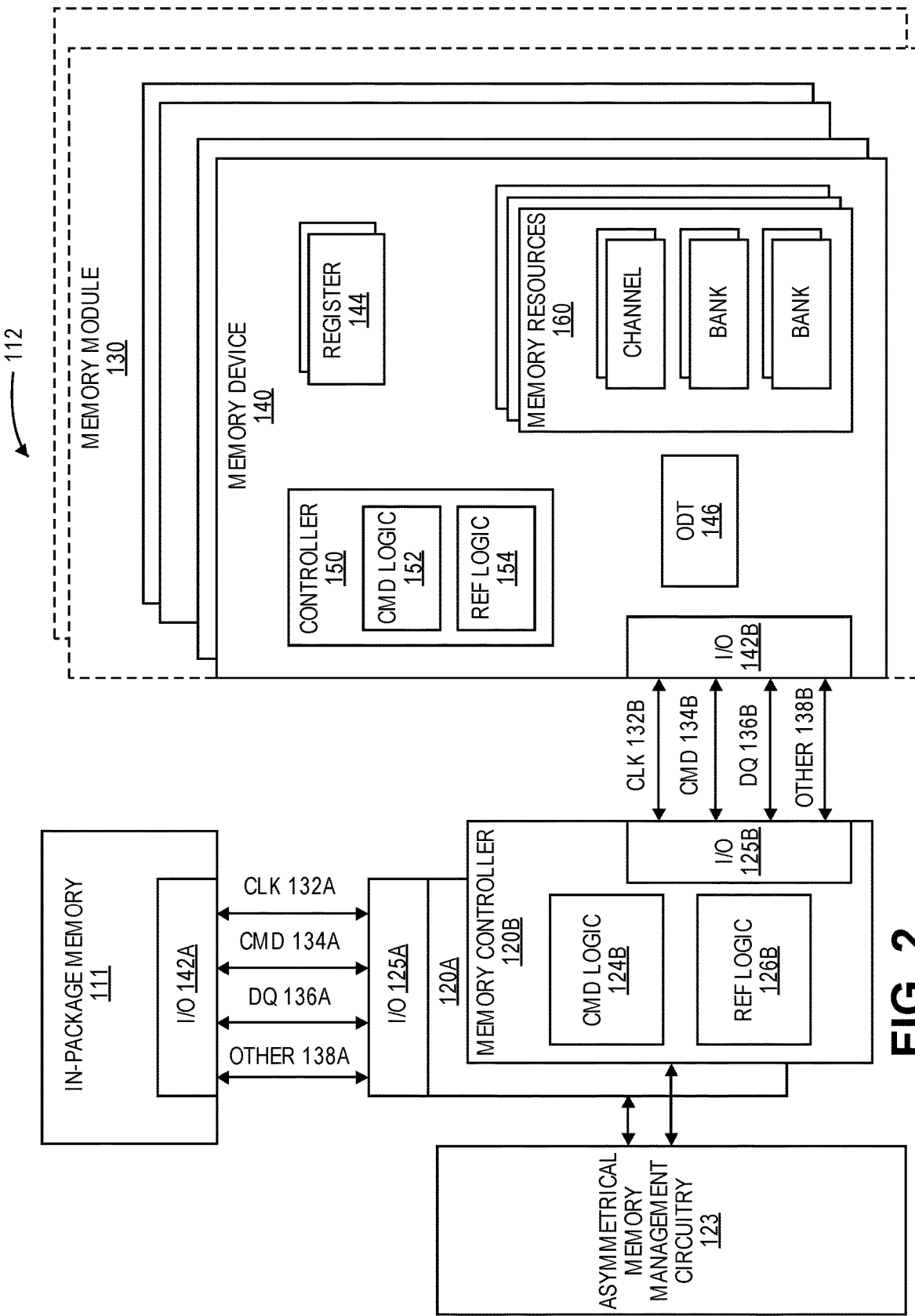
FIG. 2 is a block diagram of a memory subsystem, in accordance with embodiments.

FIG. 2 is a block diagram of a memory subsystem, in accordance with embodiments. The memory subsystem of FIG. 2 illustrates additional details of an exemplary memory controller and memory (specifically, an example of the memory controller 120B and memory 112 of FIG. 1). Although the exemplary memory controller and memory of FIG. 2 are illustrated with respect to the off-package memory 112, the in-package memory 111 and memory controller 120A can include the same or similar features.

As mentioned above, the memory 112 is coupled with a memory controller 120B. The memory 112 provides memory resources for the system and can be one of a variety of memory types, examples of which are given above with respect to FIG. 1. In one embodiment, memory 112 can include memory devices 140, and the memory devices 140 can be organized into memory modules 130. In one embodiment, memory modules 130 represent dual inline memory modules (DIMMs). In one embodiment, memory modules 130 represent other organization of multiple memory devices to share at least a portion of access or control circuitry, which can be a separate circuit, a separate device, or a separate board from the host system platform. Memory modules 130 can include multiple memory devices 140, and the memory modules can include support for multiple separate channels to the included memory devices disposed on them.

For example, in one embodiment, memory devices 140 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. In one embodiment, settings for each channel are controlled by separate mode registers or other register settings. In one embodiment, a separate memory controller manages each separate memory channel, although system 100 can be configured to have multiple channels managed by a single controller.

Memory devices 140 each include memory resources 160. Memory resources 160 represent individual arrays of memory locations or storage locations for data. Typically, memory resources 160 are managed as rows of data, accessed via cache line (rows) and bitline (individual bits within a row) control. Memory resources 160 can be organized as separate channels, ranks, and banks of memory. Channels are independent control paths to storage locations within memory devices 140. Ranks refer to common locations across multiple memory devices (e.g., same row addresses within different devices). Banks refer to arrays of memory locations within a memory device 140. In one embodiment, banks of memory are divided into sub-banks with at least a portion of shared circuitry for the sub-banks.

In one embodiment, memory devices 140 include one or more registers 144. Registers 144 represent storage devices or storage locations that provide configuration or settings for the operation of the memory device. In one embodiment, registers 144 can provide a storage location for memory device 140 to store data for access by memory controller 120 as part of a control or management operation. In one embodiment, registers 144 include Mode Registers. In one embodiment, registers 144 include multipurpose registers. The configuration of locations within register 144 can configure memory device 140 to operate in a different "mode," where command and/or address information or signal lines can trigger different operations within memory device 140 depending on the mode. Settings of register 144 can indicate configuration for I/O settings (e.g., timing, termination or ODT (on-die termination), driver configuration, and/or other I/O settings.

In one embodiment, memory device 140 includes ODT 146 as part of the interface hardware associated with I/O 142B. ODT refers to connecting impedance between a power supply rail and the signal line at the receiver side. In one embodiment, the power supply rail is VDD or the high voltage supply. In one embodiment, a memory device can terminate from the signal line to VSS or ground or the low voltage supply. In one embodiment, a memory device can terminate the signal line to both VDD and VSS.

The memory controller 120B, includes command (CMD) logic 124B, which represents logic or circuitry to generate commands to send to memory 112. Typically, the signaling in memory subsystems includes address information within or accompanying the command to indicate or select one or more memory locations where the memory devices should execute the command Memory device 140 also includes controller 150, which represents control logic within the memory device to control internal operations within the memory device. For example, controller 150 decodes commands sent by memory controller 120B and generates internal operations to execute or satisfy the commands. Controller 150 can determine what mode is selected based on register 144, and configure the access and/or execution of operations for memory resources 160 based on the selected mode. Controller 150 generates control signals to control the routing of bits within memory device 140 to provide a proper interface for the selected mode and direct a command to the proper memory locations or addresses. In one embodiment, controller 150 includes command logic 152 to receive and decode command and address information received via I/O 142B from memory controller 120B. Based on the received command and address information, controller 150 can control the timing of operations of the logic and circuitry within memory device 140 to execute the commands. According to one embodiment, controller 150 is responsible for compliance with standards or specifications.

Referring again to the memory controller 120B, in one embodiment, memory controller 120B includes refresh (REF) logic 126B. Refresh logic can be used where memory devices are volatile and need to be refreshed to retain a deterministic state. In one embodiment, refresh logic indicates a location for refresh, and a type of refresh to perform. Refresh logic can trigger self-refresh within a memory device, and/or execute external refreshes by sending refresh commands. External refreshes from the memory controller can include all bank refreshes and/or per bank refreshes. All bank refreshes cause the refreshing of a selected bank within all memory devices coupled in parallel. Per bank refreshes cause the refreshing of a specified bank within a specified memory device. In one embodiment, controller 150 within memory device 140 includes refresh logic 154 to apply refresh within memory device 140. In one embodiment, refresh logic 154 generates internal operations to perform refresh in accordance with an external refresh received from memory controller 120B. Refresh logic 154 can determine if a refresh is directed to memory device 140, and what memory resources 160 to refresh in response to the command.

The asymmetrical memory management circuitry 123 is communicatively coupled with the memory controllers 120A and 120B. The circuitry 123 receives memory access requests from another component on the SoC such as the processor, and directs memory access requests to the memory controller 120B, which generates and transmits commands to the memory 112. As mentioned above, the asymmetrical memory management circuitry 123 can include logic to allocate regions of memory for a cache, regions of memory for a high-bandwidth region that is visible to the OS, and/or allocate system memory across both the in-package and off-package memories. The in-package memory 111 and the memory controller 120A can include the same or similar features as those illustrated with respect to the off-package memory 112 of FIG. 2.

Figure 3:
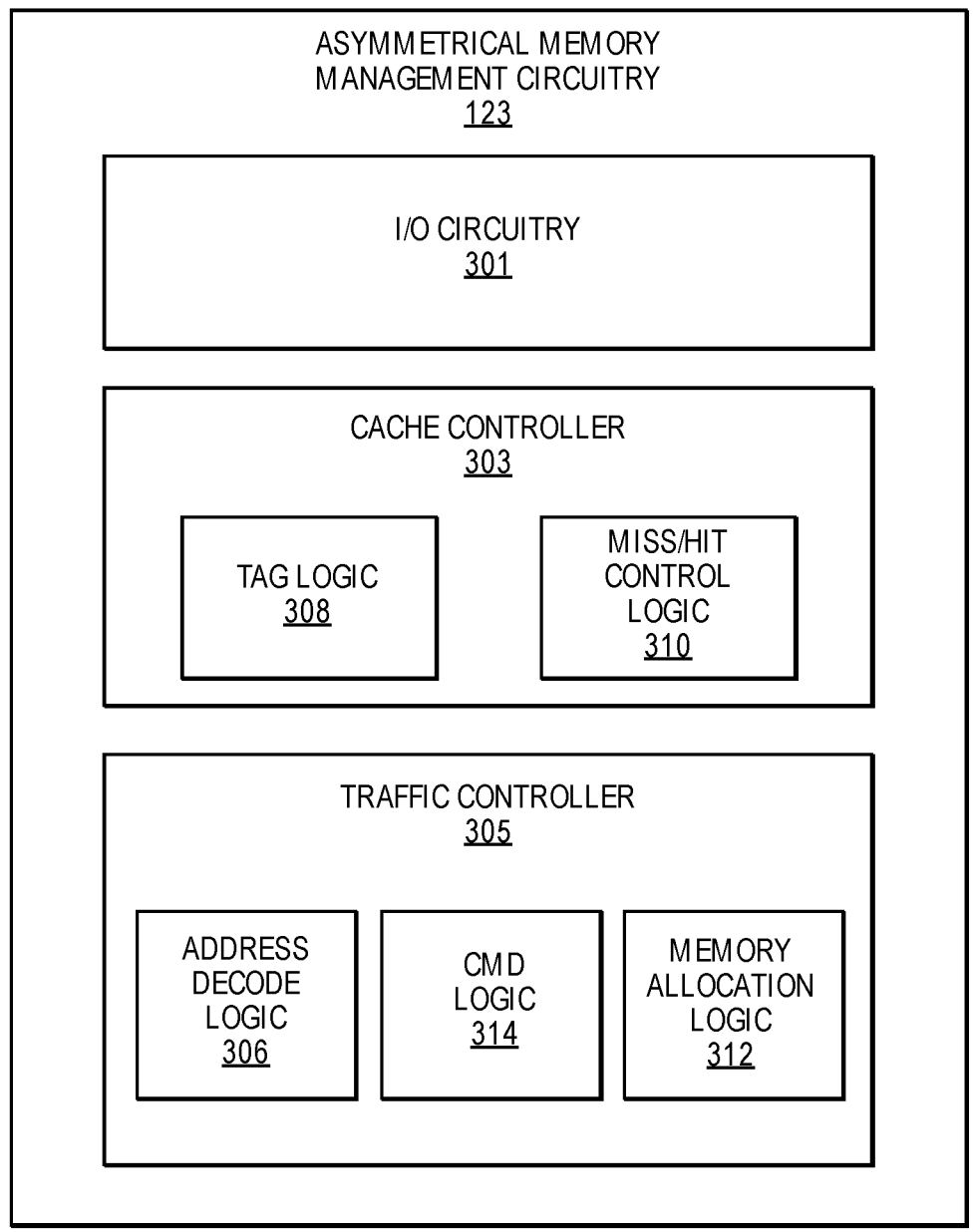
FIG. 3 is a block diagram of asymmetrical memory management circuitry, in accordance with embodiments.

FIG. 3 is a block diagram of asymmetrical memory management circuitry, in accordance with embodiments. The circuitry 123 can be located on the SoC between the processor and memory controllers (as illustrated in FIG. 1). In another embodiment, some or all of the circuitry 123 can be located in the memory controllers or located in the processor 110.

The circuitry 123 includes input/output (I/O) circuitry 301. The I/O circuitry 301 can include circuitry to receive memory access requests from, for example, the processor, and transmit memory requests to the memories (e.g., via memory controllers). The I/O circuitry 301 can include circuitry that is similar to or the same as the I/O logic 125A and 125B of FIG. 1. For example, can include drivers, receivers, transceivers, termination, pins, connectors, signal lines, and/or other circuitry to send and/or receive signals on the signal lines between the asymmetrical memory management circuitry 123 and the devices with which the circuitry 123 is coupled (e.g., a processor and memory controller). The I/O circuitry 301 receives memory access requests, such as memory read and write requests, or other memory access requests.

In the embodiment illustrated in FIG. 3, the circuitry 123 also includes a cache controller 303. As mentioned above, in some embodiments, asymmetrically memory management circuitry 123 can synthesize a high bandwidth cache via concurrent accesses to both the in-package and off-package memories. If a memory access request is for data in a cacheable region, the cache controller 303 determines whether there is a cache hit. Thus, the cache controller 303 includes tag logic 308 to access a tag array to determine if there is a cache hit or a cache miss for the requested data. The cache controller 303 also includes miss/hit control logic 310 to control access to the cache in response to a cache hit or miss (e.g., retrieve data from cache in response to a hit, determine whether to evict and/or fill in response to a miss). In one embodiment, the mapping from set and way to address in the cache data array is fixed. Therefore, on a cache miss the cache controller 303 fetches the cacheable portion of the data from the address in system memory and copies it to the location in the data array based on the set and way.

Figure 5A:
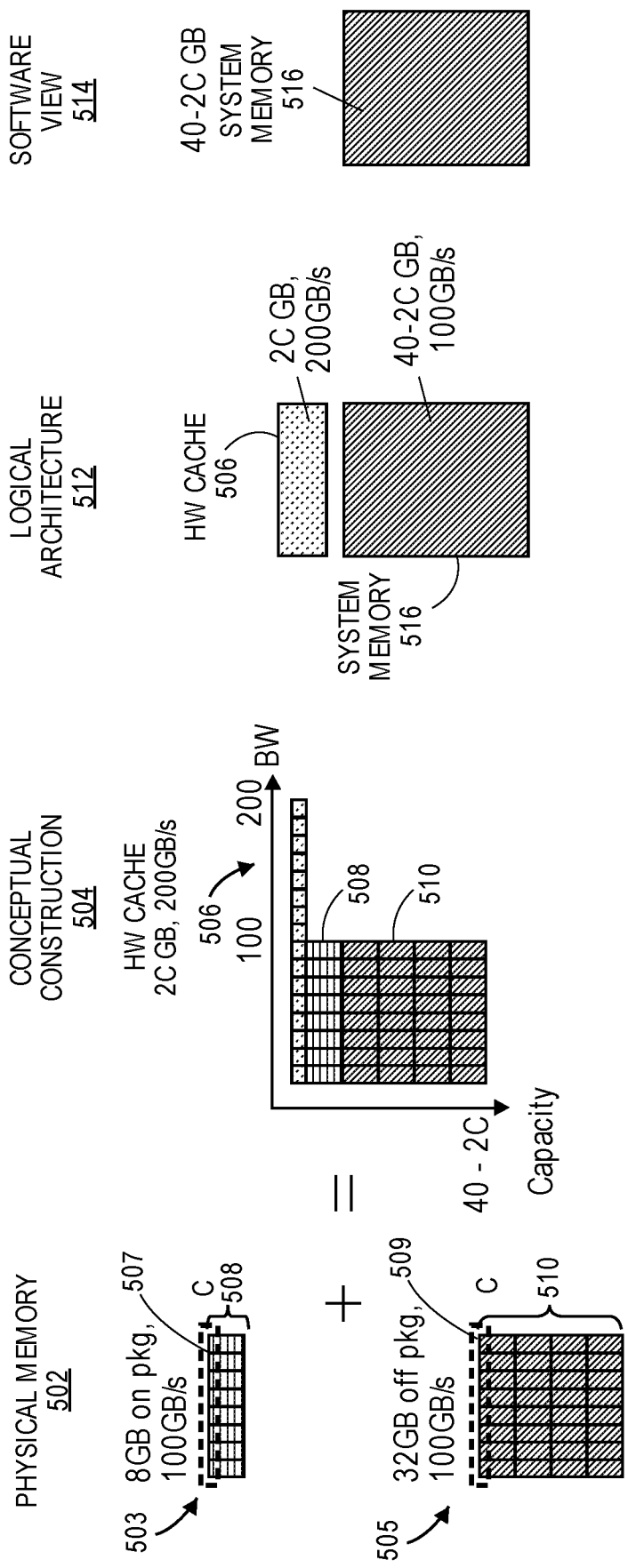
FIGS. 5A-5C illustrate representations of different embodiments in which memory accesses can simultaneously access portions of data from two memory sources to achieve a higher bandwidth, in accordance to embodiments.
Figure 5B:
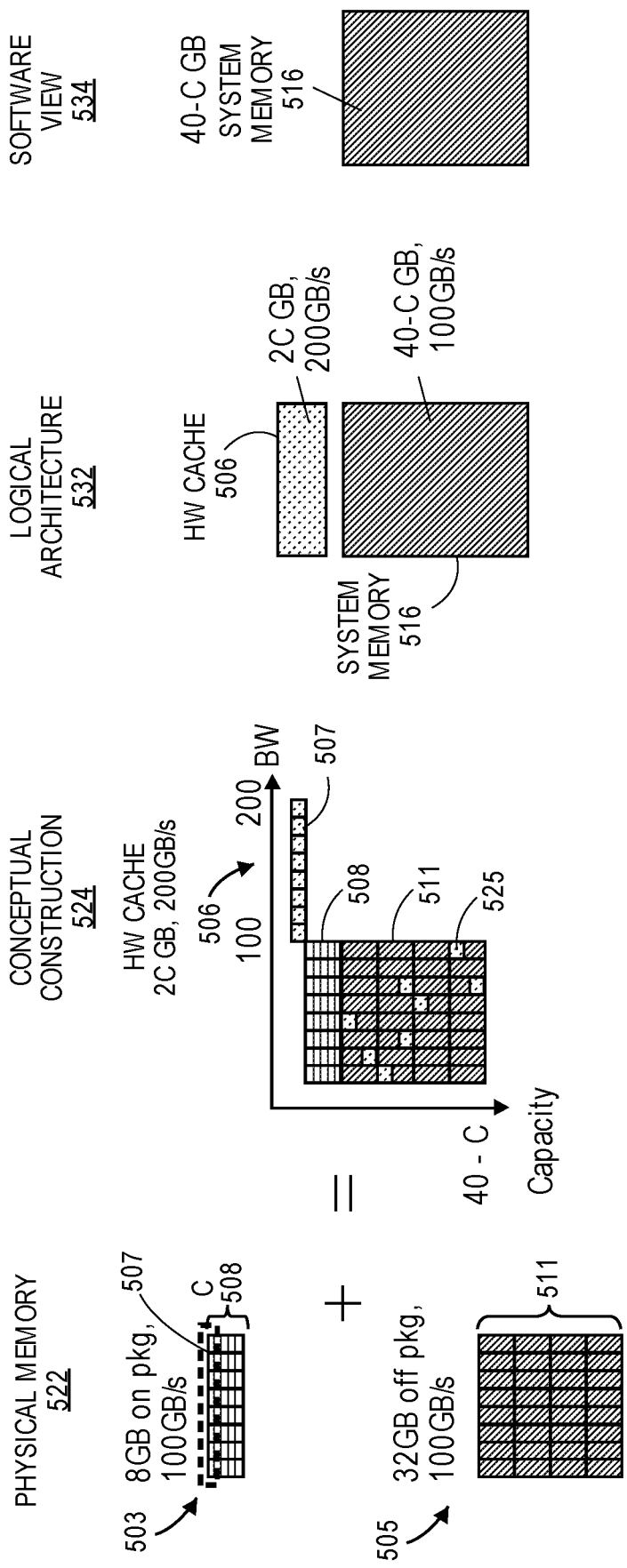

The cache controller 303 manages the tags and maps a region across all the memory channels of the in-package and off-package memories for the cache data array, in accordance with an embodiment. In one embodiment in which the in-package and off-package memories have equal bandwidth, half of the data array is mapped across all memory channels for the in-package memory. For this half, there is a fixed mapping from set and way to address in the cache data array. For the other half of the data array (e.g., the "non-cacheable" portions that stay in system memory), the tag contains an address in system memory. Thus, in one embodiment, the cache data block corresponds to a data block in system memory. On a cache miss, the cache controller 303 can change the tag to point directly to the address in system memory for such "non-cacheable" portions of data, and the cache controller 303 does not cause such data to be copied to the in-package memory on a fill or evict. In one such embodiment, such a scheme relies on the cache region and system memory using the same block size for address interleaving. Examples of how the cache controller 303 can synthesize a high bandwidth cache using in-package and off-package memory are illustrated in FIGS. 5A and 5B.

The circuitry 123 also includes a traffic controller 305. The traffic controller 305 includes address decode logic 306 to decode the address of received memory access requests and determine which memory sources store the requested data and command logic 314 to either forward or generate memory requests based on the decoding. As mentioned above, the traffic controller 305 can include a hash function implemented in hardware to determine whether a given memory access request should be routed to the in-package memory or off-package memory. The traffic controller 305 can concurrently route or transmit memory access requests to both the in-package memory and the off-package memory by interleaving addresses across an aggregate of memory channels of the in-package memory and the off-package memory. For example, within a 4 kB page, 2 kB of which can be cached, the addresses in the cacheable region can be interleaved by performing an XOR (exclusive or) logical operation on address bits, e.g., bit 7 XOR bit 13. In one such example, cache lines 0, 1 of a given first 4 kB page are cacheable, and cache lines 2,3 are non-cacheable, etc. In one such example, assuming in this example that bit 13=1 on the second 4 kB page, the mapping is inversed.

In one embodiment, the traffic controller 305 includes memory allocation logic 312 to allocate one or more parts of the memory sources to system memory, a cache, or to a non-cache high bandwidth region. Memory allocation logic 312 can allocate memory in a variety of ways, such as by programming range registers. For example, the hardware can include one or more range registers to indicate that a given system address range maps to physical memory, and one or more other range registers to indicate that given DRAM addresses map to a cache address.

Figure 4A:
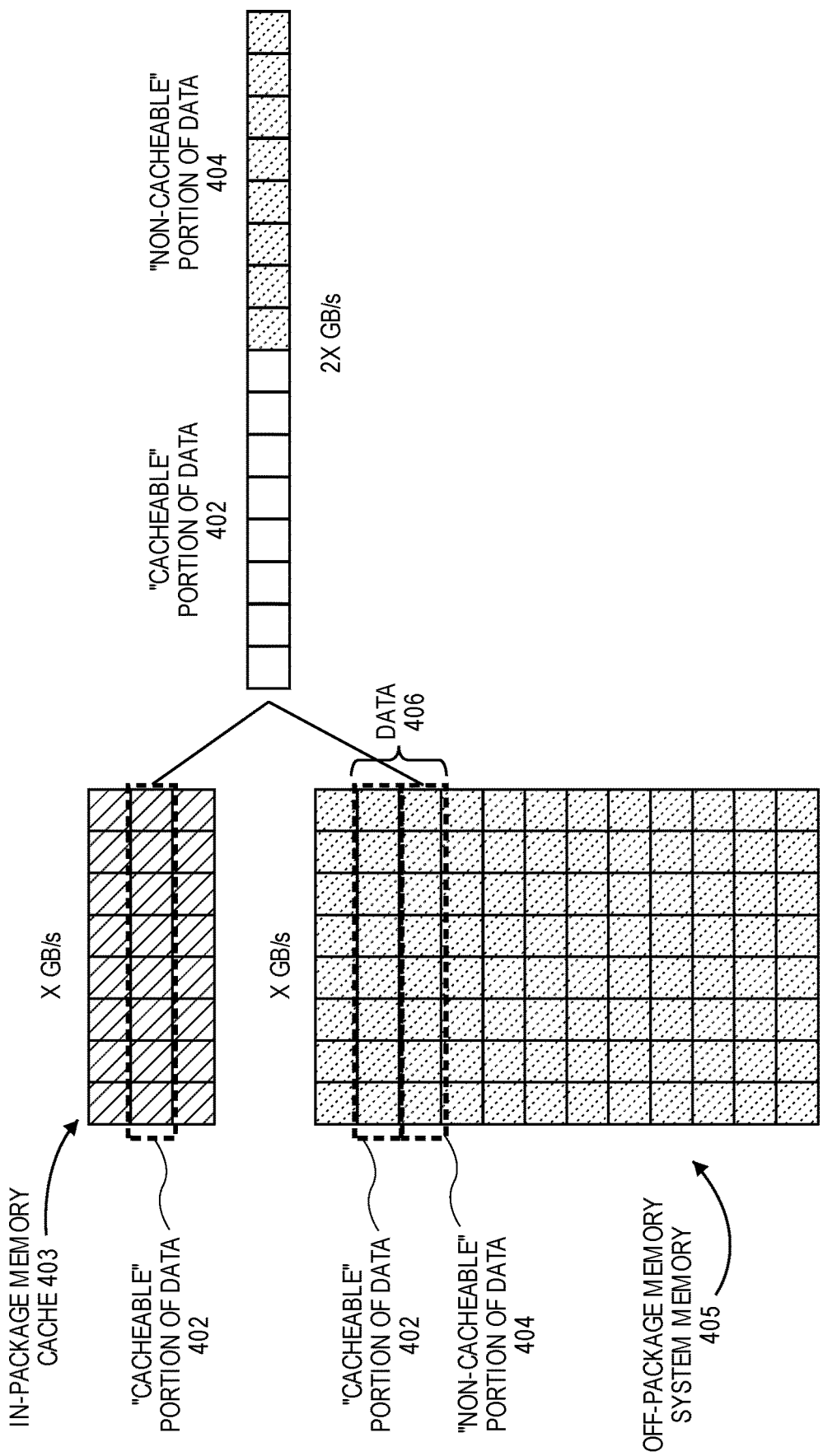
FIG. 4A is a block diagram illustrating dynamically caching a portion of highly used memory to an in-package memory, in accordance with embodiments.

FIG. 4A is a block diagram illustrating dynamically caching a portion of highly used memory to an in-package memory, in accordance with embodiments.

FIG. 4A illustrates a system with two memory sources 403 and 405, which can be the same as, or similar to, the in-package memory 111 and the off-package memory 112 of FIG. 1, respectively. For ease of reference, the memory source 403 is referred to as an in-package memory and the memory source 405 is referred to as an off-package memory. However, the memory sources 403 and 405 can be in-package or off-package memories.

Each memory source 403 and 405 has its own interface for coupling with a memory controller (e.g., such as the memory 111 of FIG. 1 that couples with the memory controller 120A, and the memory 112 that couples with the memory controller 120B). Thus, each memory source 403 and 405 is coupled with a memory controller via a separate interface and separate bus and via separate memory channels. Accordingly, each memory source has separate bandwidth capabilities. The bandwidth of the memory sources 403 and 405 is typically based at least in part on the width of the interface and the speed at which the memory is operated. In the example illustrated in FIG. 4A, both the in-package memory 403 and the off-package memory 405 have a bandwidth of X GB/s. However, in other embodiments, the memory sources can have different bandwidth capabilities.

In the embodiment illustrated in FIG. 4A, the off-package memory 405 is used as system memory, and the in-package memory 403 is operated as a cache that stores a portion of data from a frequently accessed location in system memory. For example, cache logic or a cache controller (e.g., the cache controller 303 of FIG. 3) can determine that the data 406 should be cached based on a cache replacement policy. However, unlike a traditional cache that would store any frequently accessed cache line from system memory, the in-package memory cache only stores data located in pre-determined "cacheable" regions, in accordance with embodiments. In the illustrated embodiment, the data 406 includes a cacheable portion 402 and a non-cacheable portion 404. Frequent accesses to the cacheable portion 402 will cause data from the cacheable portion 402 to be copied from the off-package memory to the cache of the in-package memory 403. Data in the non-cacheable region will remain in place in the off-package memory 405. For example, if the data 406 is a 4 kB (kilobyte) page, then only data from a 2 kB of the page that is defined as a cacheable region can be cached to the in-package memory 403. For example, cache logic can copy either an "upper" or a "lower" portion of the data (e.g., referring to the previous example, an upper 2 kB of a 4 kB page) to the in-package memory 403. In one embodiment, cache logic caches portions of data (e.g., a portion of a 4 kB page) such that the ratio of the cached portion to the non-cached portion is proportional to the BW ratios between the memory sources. For example, in FIG. 4A both the in-package memory and the off-package memory have the same bandwidth of X GB/s. Therefore, in one such example, half of the data (e.g., 2 kB of the 4 kB page) is cached. If the bandwidth capabilities of the two memory sources are not equal, the size of the cacheable portion of data is =(data size)*BW1/(BW1+BW2) where BW1 is the bandwidth of the in-package memory and BW2 is the bandwidth of the off-package memory, and data size is the size or granularity (such as a page). For example, if you take data that is a 4 kB page, BW1=100, and BW2=33, the cacheable portion of the 4 kB page is =4 kB*100/133=3 kB. In this example, the cache would store 3 kB of the 4 kB page, and the remaining 1 kB would stay in system memory on the off-package memory.

Referring again to the example illustrated in FIG. 4A, the cache of the in-package memory 403 stores the cacheable portion 402 of data 406 and the remaining portion 404 stays in system memory 405 of the off-package memory 405. Then, upon receipt of a subsequent memory request to access the data 406 (e.g., cache lines in both the in both the cacheable and non-cacheable regions), traffic control logic simultaneously accesses a cache line from a portion 402 of the data 406 from the in-package memory cache 403 and a cache line from a remaining portion 404 from the off-package memory 405, in accordance with an embodiment. For example, traffic control logic can split system memory address traffic to "non-cacheable addresses" that always reside in the off-package memory 405 and "cacheable addresses" which can be cached in the in-package memory 403. Referring again to the example of a 4 kB page, the traffic control logic accesses a cache line of the cacheable 2 kB region from the in-package memory cache 403 and simultaneously accesses another cache line in the remaining 2 kB region from the off-package memory 405. Thus, a given memory request for cached data 406 results in simultaneous accesses via both the in-package memory's interface and the off-package memory's interface, and therefore via the memory channels of both memories. Accessing the data over the memory channels of both memories concurrently can enable the data to be accessed at a combined bandwidth of 2X GB/s. Assuming a high hit rate and assuming that accesses within the page are randomly distributed, a total bandwidth of BW=BW1+BW2 can be achieved, where BW1 is the bandwidth of the in-package memory and BW2 is the bandwidth of the off-package memory. In contrast, existing technologies would access cached data only using the interface of the cache, not simultaneously using the interface of two memory sources.

Figure 4B:
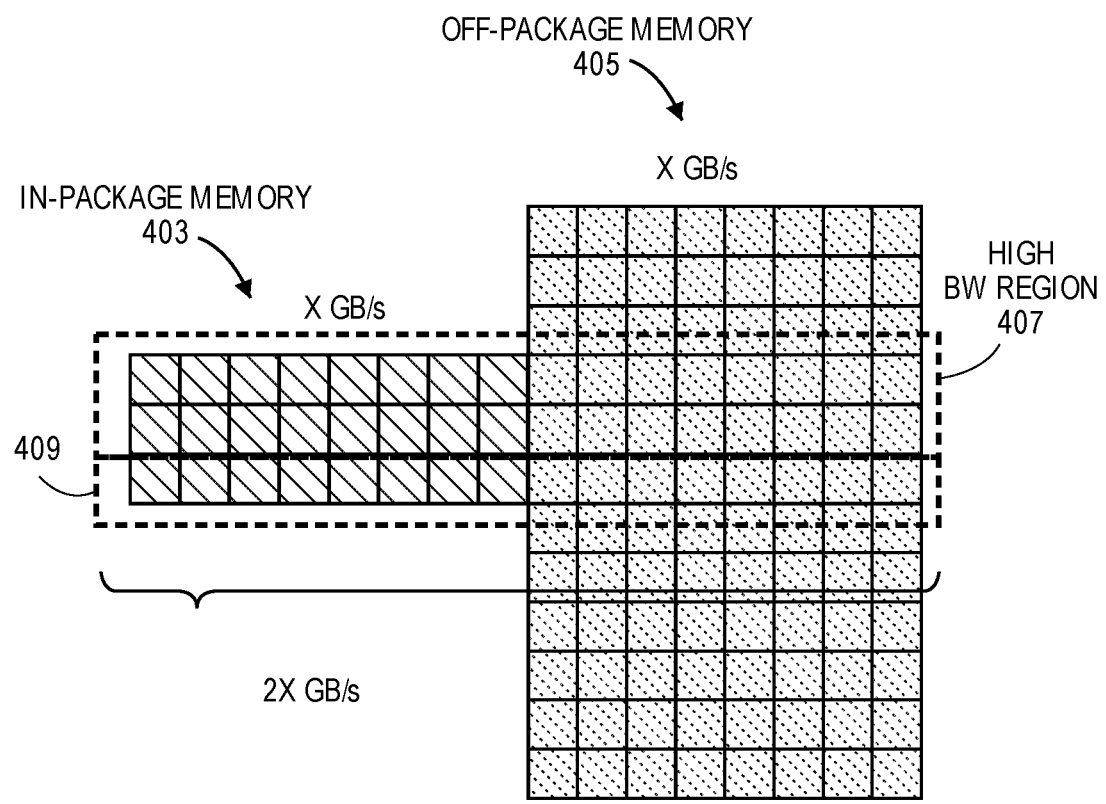
FIG. 4B is a block diagram illustrating system memory statically allocated between an in-package and off-package memory, in accordance with embodiments.

FIG. 4B is a block diagram illustrating system memory statically allocated between an in-package and off-package memory, in accordance with embodiments.

Like in FIG. 4A, the example illustrated in FIG. 4B includes two memory sources 403 and 405. However, unlike in FIG. 4A, rather than operating like a cache, the in-package memory 403 is at least partially allocated to system memory. For example, hardware logic (e.g., the asymmetrical memory management circuitry 123 of FIG. 1) statically allocates system memory between the in-package memory 403 and the off-package memory 405, which enables data to be stored across both the in-package memory 403 and the off-package memory 405. For example, data can be stored in a region 409 across both memory sources. Then, when traffic control logic (e.g., the traffic controller 305 of FIG. 3) receives memory access requests for data stored in in the regions 409 across both memory sources, different portions of the data can be accessed from both memory sources 403, 405 simultaneously. Thus, the data stored across both memory sources can be accessed at a bandwidth that is higher than either of the memory sources individually. In the illustrated example, both the in-package memory 403 and the off-package memory 405 have the same bandwidth of X GB/s. In this example, data stored across both memory sources (e.g., in the region 409) can be accessed with twice the bandwidth (2X GB/s) of the memory sources individually. Thus, the system can achieve an aggregate bandwidth of the two memory sources. In one embodiment, if both memory sources have different bandwidth, then the aggregate bandwidth for memory accesses to data across both devices is BW=BW1+BW2. If the bandwidth of one of the memory sources is X times larger than the other's bandwidth and the memory accesses are random, meaning there is no logic in the system that allocates bandwidth critical missions to the aggregated space, then the aggregate bandwidth for memory accesses to data stored across both devices is: BW=X*(BW1+BW2)+(1−X)*BW2 (e.g., if BW1=100, BW2=33, and X=size1/size2=0.5, then BW=0.5*133+ 0.5*33=83). Therefore, random traffic may not take full advantage of the maximum bandwidth capabilities of the two memory sources.

In one embodiment, the number of memory accesses using the full aggregate bandwidth of both memory sources can be increased by making the OS or driver aware of the memory space. By making the memory space visible to the OS or driver, the OS or driver can pre-allocate memory for traffic needing high bandwidth across both memory sources. For example, hardware logic (e.g., the asymmetrical memory management circuitry 123 of FIG. 1) can assign regions of each memory source 403, 405 to a high bandwidth region 407 by configuring registers. For example, hardware logic can store address information in one or more registers to identify a portion of each of the memory sources 403, 405 that form a high bandwidth region. Then, applications requiring high bandwidth, such as an embedded graphics engine, or other uses that the operating system or drivers may be aware of, can allocate pages of memory that requires high bandwidth across both memory sources 403, 405 to maximize bandwidth for those applications. Accordingly, by making the OS or driver aware of a high bandwidth region, the OS or driver can actively store data for high bandwidth applications across both memory sources 403, 405 to enable accessing the data using the interfaces of both memory sources 403, 405 simultaneously.

Figure 5C:
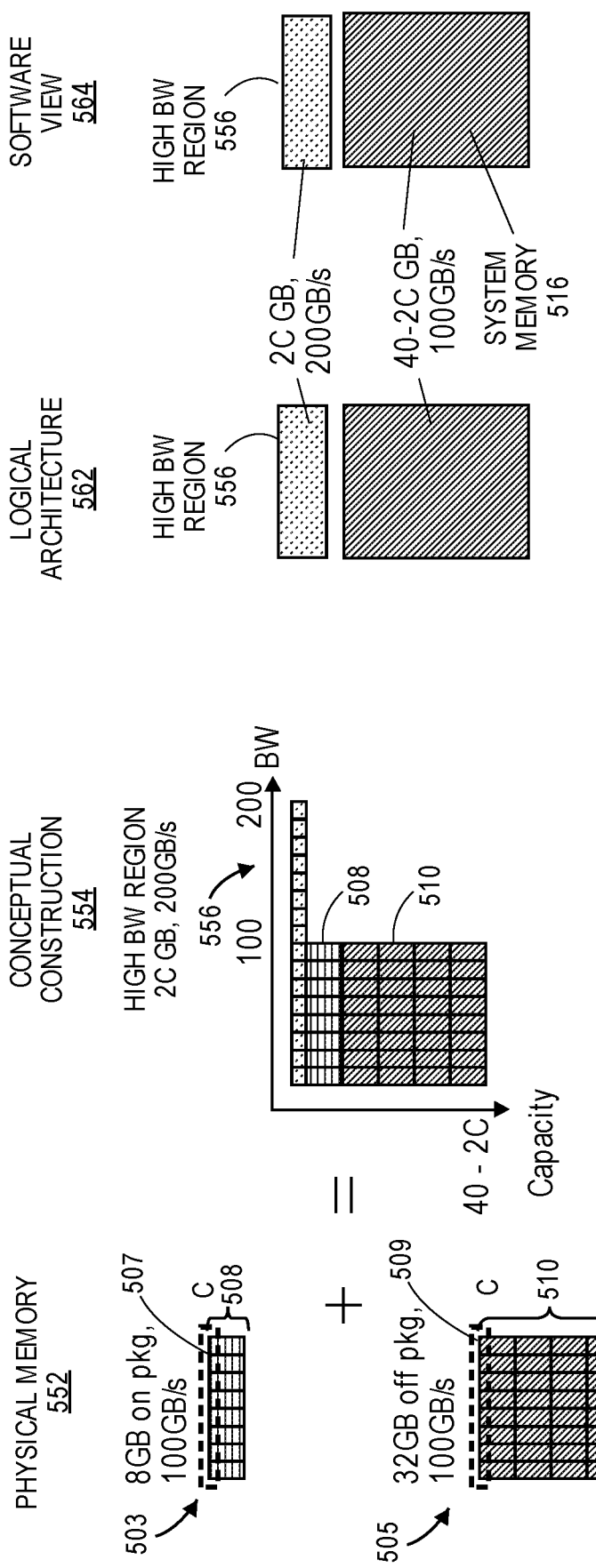

FIGS. 5A-5C illustrate representations of different embodiments in which memory accesses can simultaneously access portions of data from two memory sources to achieve a higher bandwidth, in accordance to embodiments.

FIG. 5A is a representation of a hardware cache to enable high bandwidth accesses, in accordance with an embodiment.

FIG. 5A includes several perspectives, including a physical memory view 502, a conceptual construction view 504, a logical architecture view 512, and a software view 514. Referring first to the physical memory view 502, FIG. 5A illustrates two memory sources 503 and 505. The memory sources 503 and 505 can be the same as, or similar to, the in-package memory 111 and the off-package memory 112 of FIG. 1, respectively. For ease of reference, the memory source 503 is referred to as an in-package memory and the memory source 505 is referred to as an off-package memory. However, the memory sources 503 and 505 can be in-package or off-package memories. In-package memory is often faster, but more expensive than off-package memory, and hence the in-package memory included in a system may be smaller in capacity than the off-package memory. In the illustrated example, the memory source 503 is smaller in capacity than the memory source 505. Specifically, in the illustrated example, the in-package memory 503 is 8 GB and the off-package memory 505 is 32 GB. Although the memory source 503 is illustrated as being smaller than the memory source 505, the memories can be the same size, or the memory source 505 can be smaller.

Each memory source 503 and 505 has its own interface for coupling with a memory controller (e.g., such as the memory 111 of FIG. 1 that couples with the memory controller 120A, and the memory 112 that couples with the memory controller 120B). Thus, each memory source 503 and 505 is coupled with a memory controller via a separate interface and separate bus and memory channels. Accordingly, each memory source has bandwidth capabilities. The bandwidth of the memory sources 503 and 505 is typically based at least in part on the width of the interface. In the example illustrated in FIG. 5A, the in-package memory 503 and the off-package memory both have the same bandwidth of 100 GB/s. However, as mentioned above, in some embodiments, the in-package memory source 503 has a higher bandwidth than the off-package memory 505 due to a wider interface, higher frequency of operation, or both.

In one embodiment, a portion or strip C of the in-package memory 503 is allocated for use as a cache. For example, in one embodiment, hardware logic (e.g., logic 123 of FIG. 1) in the SoC assigns a region 507 of the in-package memory 503 to be used as a hardware cache. The region 507 of the in-package memory that is allocated for the cache can be static or programmable based on, for example, register settings. For example, the memories 503 and 505 can include one or more registers to indicate the size of the region reserved for the cache (e.g., the size of 'C'), the location of the region reserved for the cache (e.g., an address range), or both. As mentioned above with respect to FIG. 4A, in one embodiment, the cache of the in-package memory stores only a portion of data that is to be cached. Then, a subsequent access to cached data accesses cache lines from the cached portion of the data from the in-package memory 503 and concurrently accesses the cache lines from the remaining portion from the off-package memory 505.

In the illustrated embodiment in FIG. 5A, a portion C of the off-package memory 505 is also allocated for storing a portion of data to be "cached" on the off-package memory. Thus, a conceptual hardware "cache" is formed from the region 507 of the in-package memory together with the region 509 of the off-package memory. The size and location of the region 509 reserved for the cache can be based on register settings, such as described above with respect to the in-package memory 503. Data located in "non-cacheable" regions (in the sense that the data cannot be cached on the in-package memory) can be copied to the region 509 of the off-package memory.

Referring now to the conceptual construction view 504, a conceptual hardware cache 506 can be formed from the region 507 of the in-package memory and region 509 of the off-package memory. Thus, in one such embodiment, the hardware cache 506 has a bandwidth that is greater (in the illustrated example, twice the bandwidth) than the in-package and off-package memories individually. For example, consider data to be cached that has a size of 4 kB. A portion of the 4 kB data (e.g., an upper 2 kB) can be copied to the region 507 of the in-package memory 503. A remaining portion of the 4 kB data (e.g., a lower 2 kB) can be copied to the region 509 of the off-package memory. After caching the data, the data continues to be stored in system memory (e.g., the region 510 of the off-package memory 505), an upper 2 kB is stored in the cache (e.g., the region 507) of the in-package memory 503) and a remaining lower 2 kB is stored in the region 509 of the off-package memory. Thus, a subsequent access to the cached data results in the upper 2 kB being accessed from the region 507 of the in-package memory 503 and the lower 2 kB being simultaneously accessed from the region 509 of the off-package memory.

In one embodiment, hardware logic within the SoC manages the tags and uses a 2C GB region mapped across all the memory channels for the in-package and off-package memories for the cache data array. In one embodiment, the mapping of cache sets and ways to the data array is arranged to interleave expected request access patterns across the aggregate memory system channels to achieve high bandwidth. For example, in a sectored cache in which the cache block granularity exceeds the access granularity, the addresses of successive locations are mapped to different memory system channels. Thus, accesses are split or interleaved across the channels of both the in-package memory 503 and the off-package memory 505. Thus, as illustrated in the conceptual construction view 504, the hardware cache 506 has an effective bandwidth that is twice that of the individual memory sources. In contrast, existing in-package memory caches are formed entirely from the in-package memory and therefore do not have the high bandwidth that is enabled by embodiments herein.

As mentioned above, the capacity of an in-package memory is often greater than what is needed for a cache. Thus, existing systems may have in-package memory capacity that is underutilized. In one embodiment, the remaining capacity of in-package memory that is not reserved for the cache is used as system memory. For example, hardware logic in the SoC maps the non-cache region 508 of the in-package memory 503 so it extends the non-cache region 510 of the off-package memory 505. For example, suppose in-package memory capacity is 8 GB, off-package memory capacity is 32 GB, and C=1 GB. In one such embodiment, hardware logic on the SoC maps as follows: the first 1 GB of the in-package memory capacity and the last 1 GB of the off-package memory comprise a 2 GB region that is mapped across all memory channels. The first 31 GB of system memory maps to the first 31 GB of the off-package memory 505. The last 7 GB of system memory maps to the last 7 GB of the in-package memory 503. Without loss of generality, the regions can be the last or first or other portion of the system memory regions, which can be static or programmable (e.g., via register settings). Thus, in the example illustrated in FIG. 5A, hardware logic forms a high bandwidth cache region across both the in-package and off-package memories 503, 505, and maps system memory to the remaining regions of both the in-package and off-package memories. The regions used as a cache can be optimized for high bandwidth (e.g., using high BW device, such as LPDDR5 or HBM devices), while the regions used as system memory can be optimized for traffic from a processor that does not require high bandwidth (as opposed to traffic that may require high bandwidth such as traffic from another SoC agent like graphics or imaging).

Referring to the logical architecture view 512, a hardware cache 506 with a size of 2C is synthesized from portions 507 and 509 of the memory sources 503 and 505, respectively. The remaining portions of both memory sources 503 and 505 are used as a system memory 516. In the example illustrated in FIG. 5A, the size of system memory is 40-2C (forty minus two times C) GB, which is equal to the total capacity of both memory sources 503 and 505 minus the reserved capacity for the cache 506. Note that such an implementation can have the drawback of stealing a full 2C of capacity from system memory for use as a cache. Finally, referring to the software view 514, software such as the operating system sees the system memory 516, but not the hardware cache 506.

FIG. 5B is another representation of a hardware cache to enable high bandwidth accesses, in accordance with an embodiment. FIG. 5B shows an optimization for a hardware cache implementation where only misses to half the hardware cache are filled by copying data, and for the other half of the data is left in place in system memory, in accordance with an embodiment.

Referring to the physical memory view 522, as in FIG. 5A, the physical memory includes an in-package memory 503 and an off-package memory 505. A region 507 of size C from the in-package memory 503 is used for a hardware cache. Also like FIG. 5A, for given data to be cached, only a portion of the data is stored in the region 507 of the in-package memory. Accesses to cached data result in accessing a portion of the data from the region 507 of the in-package memory, and the remaining portion from system memory of the off-package memory. However, unlike FIG. 5A, there is no fixed region of the off-package memory that is used as a cache, and therefore the remaining "non-cached" portion of cached data is not copied upon a fill or evict. Instead, the remaining "non-cached" portion of data remains in place in system memory. Accordingly, the entire capacity 511 of the off-package memory 505 can be available for system memory. For example, referring to the conceptual construction view 524, for given cached data, a portion is copied to the region 507 of the in-package memory and the remaining portion stays in place in the off-package memory, as illustrated by the scattered squares 525. Thus, an access to the cached data results in accessing the cacheable portion from the in-package memory and the remaining portion from its original location on the off-package memory. Thus, accessing cached data results in using both the interface of the in-package memory 503 and simultaneously using the interface of the off-package memory 505. Accordingly, accesses to cached data result in a higher bandwidth (in the illustrated example, 200 GB/s) than for traditional in-package caches.

One of the advantages of the embodiment illustrated in FIG. 5B is that it reduces the amount of system memory "stolen" by the cache. For example, since a portion of cached data is left in place in system memory (rather than being copied to a reserved region on the off-package memory, such as in FIG. 5A), the entire off-package memory can be used as system memory. Accordingly, the logical architecture view 532 illustrates that the system memory 516 has a capacity of 40–C (forty minus C) GB. In this example, although the portion of memory that is used specifically for the cache is C (region 507 of the in-package memory), the logical architecture view 532 shows a 2C GB cache. The 2C GB cache is synthesized from the region 507 of the in-package memory, and the remaining portions 525 of the off-package memory. Thus, in the logical architecture view, the portions 525 of the off-package memory are counted towards the capacity of both system memory 516 and the HW cache 506 because they are not reserved for the cache 506, but the portions 525 of system memory can be accessed concurrently with data cached in the in-package memory for high bandwidth accesses. The software view 534 also shows system memory with a capacity of 40 C GB.

FIG. 5C is a representation of a high bandwidth region to enable high bandwidth accesses, in accordance with an embodiment. FIG. 5C is similar to FIG. 5A in the sense that there is an in-package memory 503 and off-package memory 505, each with a region of size C reserved for high bandwidth access. However, unlike FIG. 5A, FIG. 5C illustrates a high bandwidth region that is under the control of the operating system or drivers as an explicitly managed memory region, in accordance with embodiments. Accordingly, the physical memory view 552, conceptual construction view 554, and logical architecture view 562 are similar to those of FIG. 5A except for a high bandwidth region rather than specifically for a hardware cache. However, unlike in FIG. 5A, the high bandwidth region 556 is visible in the software view 564.

Figure 6B:
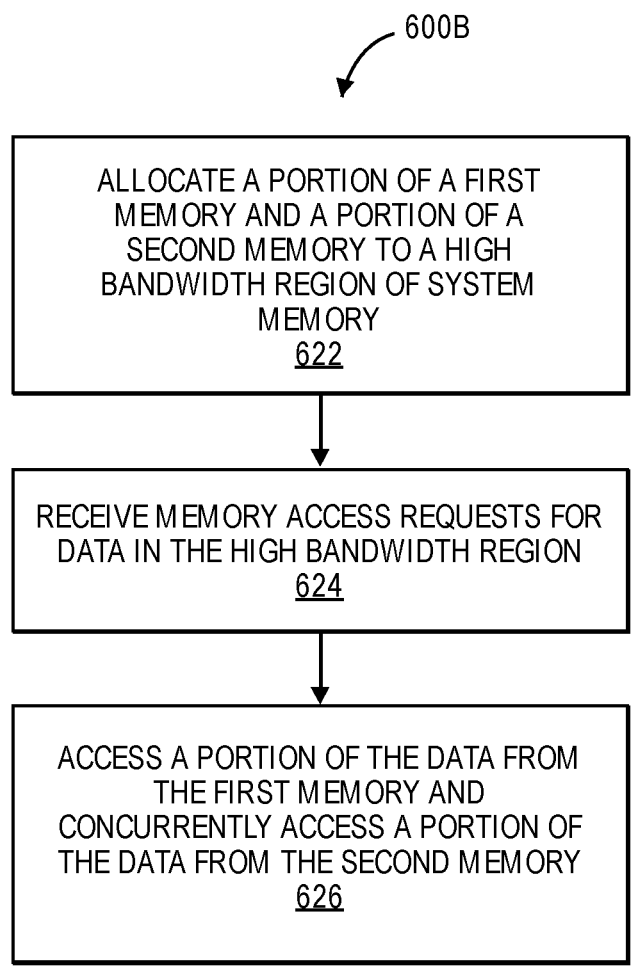

FIGS. 6A and 6B are flow diagrams of methods of managing multiple memory sources to enable high bandwidth access, in accordance with embodiments. The methods of FIGS. 6A and 6B can be performed by hardware logic, such as one or more of the components of the asymmetrical memory management circuitry 123 of FIG. 3. For simplicity, the methods of FIGS. 6A and 6B are described as being performed by "hardware logic," although one or more logic blocks such as the logic blocks illustrated in FIG. 3 can perform the operations of them methods 600A and 600B. FIG. 6A illustrates synthesis of a high bandwidth cache, and FIG. 6B illustrates managing memory and traffic to enable high bandwidth accesses to system memory, in accordance with embodiments.

Referring first to FIG. 6A, FIG. 6A is a flow diagram of a method 600A of synthesizing a high bandwidth cache from multiple memory sources, in accordance with an embodiment. The method 600A is performed in a system with at least two memory sources, including a first memory and a second memory. For example, the method 600A can be performed in a system such as the system 100 of FIG. 1, which includes in-package memory 111 and off-package memory 112. In this embodiment, hardware logic in the SoC (e.g., I/O circuitry 301 of the asymmetrical memory management circuitry 123) receives memory access requests for data stored in the second memory such as a memory source used as system memory, at operation 602. For example, hardware logic in the SoC can receive memory read or write requests to access cache lines (e.g., 64 byte cache lines) from a processor or other entity that can generate memory access requests. The memory access requests can be read or write requests for data stored in system memory. Typically, memory traffic includes consecutive cache lines accesses by applications. For the example in FIG. 6A, assume that the data is stored in the second memory (e.g., an off-package memory such as memory 112 of FIG. 1, which is typically larger in capacity than in-package memory).

After receiving the memory access requests for the data, hardware logic determines whether the memory access requests are to cacheable or non-cacheable regions, at operation 603. hardware logic determines whether the data is stored in a cache, at operation 604. For the example in FIG. 6A, assume that the cache is formed from the first memory (e.g., an in-package memory such as memory 111 of FIG. 1). For example, at least part of the in-package memory is allocated or reserved for operation as a cache. As explained above, the cache stored only a portion of cached data. For example, if the cached data has a size of 4 kB, the cache of the in-package memory can store 1 or 2 kB of the data (or another portion of the data), depending on the bandwidth of the in-package memory. As mentioned above, the portion of data that is stored in the cache relative to the portion that is not stored in the cache is equal to the ratio of bandwidths of the two memory sources, in accordance with embodiments.

In one embodiment, the hardware logic performs a hash function to identify cacheable and non-cacheable addresses. For example, the traffic controller 305 of FIG. 3 can perform a hash function to determine whether the addresses are in cacheable or non-cacheable regions (e.g., upper or lower portions of a page). If the memory access request is to a non-cacheable region, 604 NO branch, the hardware logic accesses the data from system memory at operation 610. If the access is to a cacheable region, 604 YES branch, the hardware logic determines whether there is a cache hit, operation 605.

If hardware logic (e.g., the cache controller 303 of FIG. 3) detects a cache hit, 606 YES branch, hardware logic accesses a portion of the data from the first memory at operation 608, at the same time the data from the second memory is being accessed, at operation 610. Thus, a portion of data is accessed from one memory (e.g., from a memory that is operating as a cache) while another portion of the data is accessed from another memory (e.g., from system memory). Because the two memory sources have separate interfaces, the data can be accessed using the bandwidth of both the interfaces simultaneously. Thus, in an example where the bandwidth of the memory sources is the same (e.g., X GB/s), the hardware logic accesses the data at a rate of 2X GB/s. If hardware logic detects a cache miss, 606 NO branch, then hardware logic accesses the data solely from the second memory at operation 612, and therefore at a lower bandwidth (e.g., the bandwidth of the second memory only, which in this example is X GB/s). Also upon a cache miss, if hardware logic determines that the recently accessed data should be cached, hardware logic can cache the data by copying a portion of the data to the cache in the first memory, at operation 614.

Also, referring to the data in the "non-cacheable" region, hardware logic can either copy the data to a region of the second memory reserved for high bandwidth accesses, or the hardware logic can leave the data in place in the second memory without also copying it to a reserved high bandwidth region. FIGS. 5A and 5B illustrate examples of such embodiments. Specifically, FIG. 5A illustrates an embodiment in which hardware logic allocates a region of the second memory (e.g., the off-package memory) for high bandwidth accesses. FIG. 5B illustrates an embodiment in which data is left in its original location in system memory. In both cases, a high bandwidth cache can be synthesized using the reserved region of the in-package memory to store part of the data and by simultaneously accessing the remaining part of the data from the off-package memory.

FIG. 6B illustrates managing memory and traffic to enable high bandwidth accesses to system memory, in accordance with embodiments. Like the method 600A of FIG. 6A, the method 600B is performed in a system with at least two memory sources, including a first and a second memory. For example, the method 600B can be performed in a system such as the system 100 of FIG. 1, which includes in-package memory 111 and off-package memory 112. In this embodiment, hardware logic in the SoC (e.g., traffic controller 305 of the asymmetrical memory management circuitry 123 of FIG. 3) allocates a portion of a first memory and a portion of a second memory to a high bandwidth region of system memory, at operation 622. The high bandwidth region can be defined using registers (e.g., range registers), in accordance with embodiments.

Then, hardware logic receives memory access requests to access data located in the high bandwidth region, at operation 624. In response to receipt of the memory access requests, hardware logic accesses a portion of data from the first memory and concurrently accesses another portion of data from the second memory, at operation 626. For example, hardware logic (e.g., the traffic controller 305 of FIG. 3) includes circuitry to map received memory requests to the two memory sources, which can include routing the requests to each memory source, in accordance with embodiments. Because the two memory have separate interfaces the data can be accessed using the bandwidth of both the interfaces simultaneously. Thus, in an example where the bandwidth of the memory sources is the same (e.g., X GB/s), the hardware logic accesses the data at a rate of 2X GB/s. With random traffic, some data may be stored on only one memory source, while other data may be stored across both memory sources. In this case, the traffic stored on only one memory source is accessible at the bandwidth of that memory source, and the data stored across multiple devices is accessible at an aggregate bandwidth proportional to the size (capacity) of the memory sources. With some entity aware of the memory space, better results can be achieved by pre-allocating memory for traffic needing high bandwidth to both memories. For example, FIG. 5C illustrates an embodiment with a high bandwidth region 556 formed from regions of both the in-package memory 503 and the off-package memory 505. The software has visibility of the high bandwidth region and is able to store data in the high bandwidth region that is used for high bandwidth applications, in accordance with embodiments.

Thus, both the methods 600A and 600B illustrate methods of managing memory to enable high bandwidth memory accesses using multiple memory sources. Note that although the methods 600A and 600B specifically refer to first and second memory sources, embodiments also apply to systems with more than two memory sources. Furthermore, the embodiments can be combined. For example, hardware logic can allocate system memory across multiple memory sources, synthesize a cache from both memory sources, form a high bandwidth region that is visible to software from both memory sources, or a combination of any of these embodiments.

Figure 7:
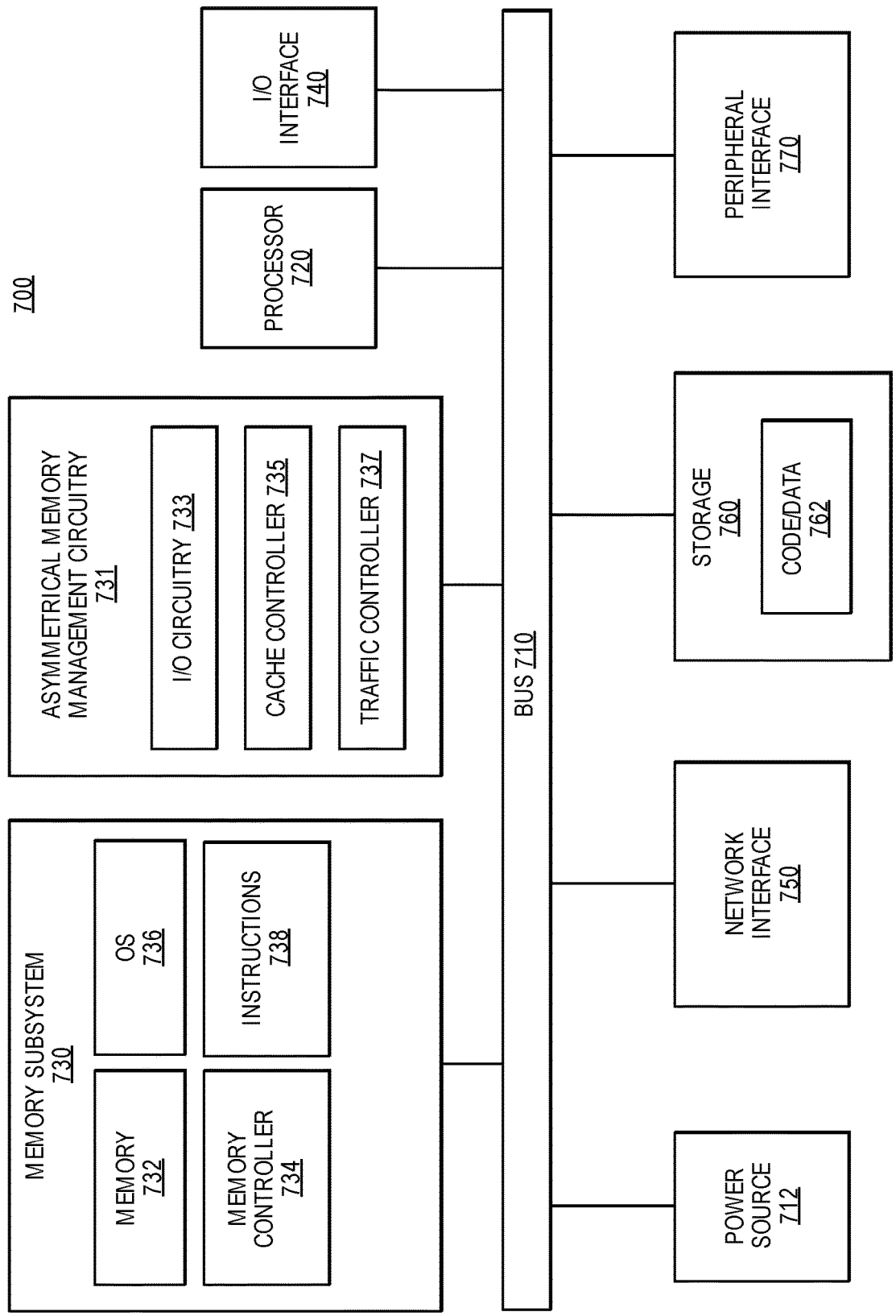
FIG. 7 is a block diagram of a computing system in which an asymmetrical memory management circuit can be implemented, in accordance with an embodiment.

FIG. 7 is a block diagram of a computing system in which an asymmetrical memory management circuit can be implemented, in accordance with an embodiment. System 700 represents a computing device in accordance with any embodiment described herein, and can be a laptop computer, a desktop computer, a server, a gaming or entertainment control system, a scanner, copier, printer, routing or switching device, or other electronic device. System 700 includes processor 720, which provides processing, operation management, and execution of instructions for system 700. Processor 720 can include any type of microprocessor, central processing unit (CPU), processing core, or other processing hardware to provide processing for system 700. Processor 720 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 can include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720. Memory subsystem 730 includes memory device 732 where it stores data, instructions, programs, or other items. In one embodiment, memory subsystem includes memory controller 734, which is a memory controller to generate and issue commands to memory device 732. It will be understood that memory controller 734 could be a physical part of processor 720.

In one embodiment, system 700 further includes an asymmetric memory management circuitry 731 to implement one or more of the embodiments described herein. In one embodiment, the asymmetric memory management circuitry 731 is on the same package as the processor 720. The asymmetric memory management circuitry 731 includes I/O circuitry 733, a cache controller 735, and a traffic controller 737 in accordance with embodiments herein.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 can also correspond to interfaces in network interface 750.

Power source 712 couples to bus 710 to provide power to the components of system 700. In one embodiment, power source 712 includes an AC to DC (alternating current to direct current) adapter to plug into a wall outlet. Such AC power can be renewable energy (e.g., solar power). In one embodiment, power source 712 includes only DC power, which can be provided by a DC power source, such as an external AC to DC converter. In one embodiment, power source 712 includes wireless charging hardware to charge via proximity to a charging field. In one embodiment, power source 712 can include an internal battery, AC-DC converter at least to receive alternating current and supply direct current, renewable energy source (e.g., solar power or motion based power), or the like.

System 700 also includes one or more input/output (I/O) interface(s) 740, network interface 750, one or more internal mass storage device(s) 760, and peripheral interface 770 coupled to bus 710. I/O interface 740 can include one or more interface components through which a user interacts with system 700 (e.g., video, audio, and/or alphanumeric interfacing). Network interface 750 provides system 700 the ability to communicate with remote devices (e.g., servers, other computing devices) over one or more networks. Network interface 750 can include an Ethernet adapter, wireless interconnection components, USB (universal serial bus), or other wired or wireless standards-based or proprietary interfaces.

Storage 760 can be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 can be generically considered to be a "memory," although memory 730 is the executing or operating memory to provide instructions to processor 720. Whereas storage 760 is nonvolatile, memory 730 can include volatile memory (i.e., the value or state of the data is indeterminate if power is interrupted to system 700).

Peripheral interface 770 can include any hardware interface not specifically mentioned above. Peripherals refer generally to devices that connect dependently to system 700. A dependent connection is one where system 700 provides the software and/or hardware platform on which operation executes, and with which a user interacts.

Figure 8:
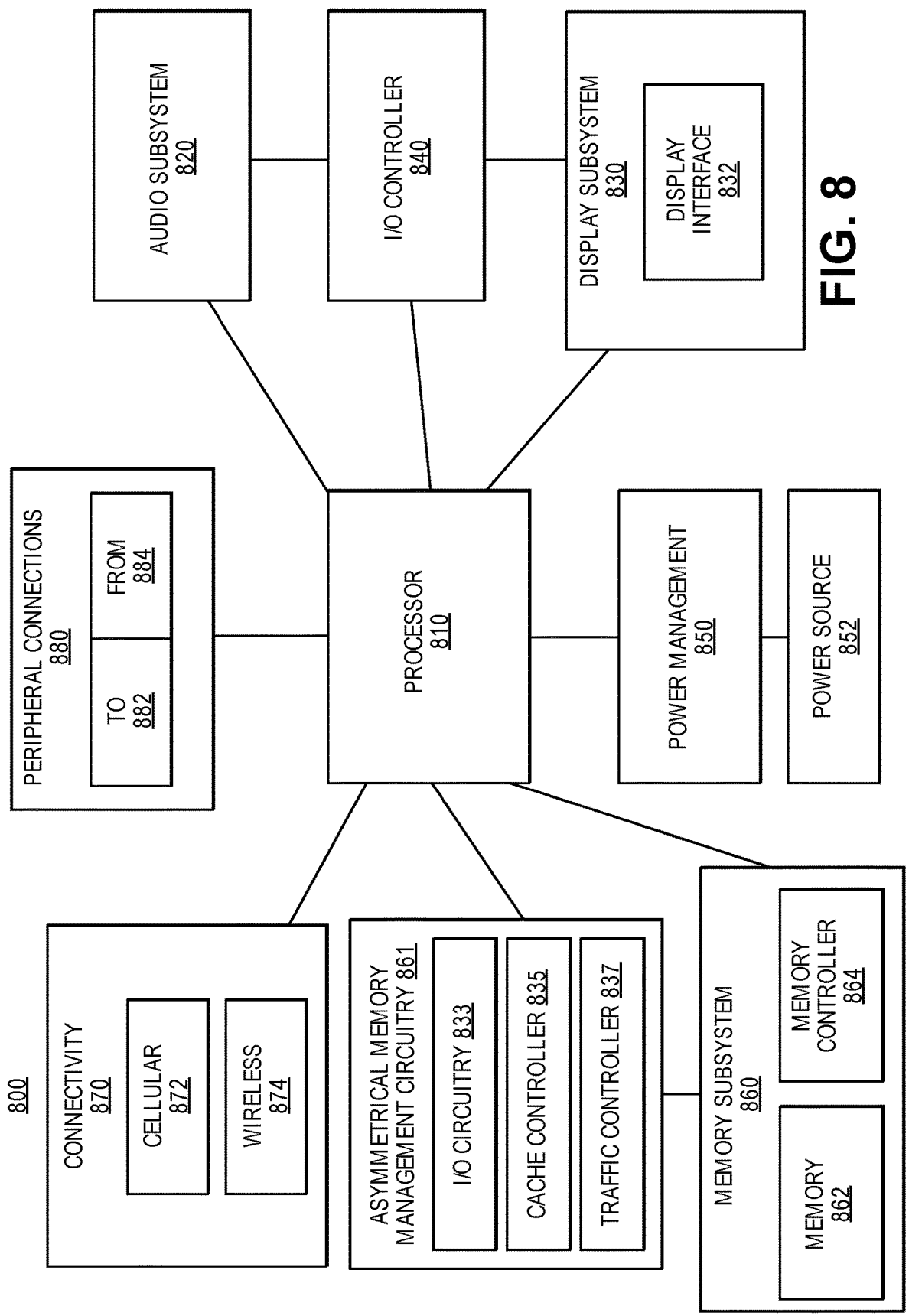
FIG. 8 is a block diagram of an embodiment of a mobile device in which asymmetric memory management can be implemented.

FIG. 8 is a block diagram of an embodiment of a mobile device in which asymmetric memory management can be implemented. Device 800 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display for a user to interact with the computing device. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that provides both output and input to a user. In one embodiment, display subsystem 830 includes a high definition (HD) display that provides an output to a user. High definition can refer to a display having a pixel density of approximately 100 pixels per inch (PPI) or greater, and can include formats such as full HD (e.g., 1080p), retina displays, 4K (ultra high definition or UHD), or others.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features). In one embodiment, device 800 includes power management 850 that manages battery power usage, charging of the battery, and features related to power saving operation. Power management 850 manages power from power source 852, which provides power to the components of system 800. In one embodiment, power source 852 includes an AC to DC (alternating current to direct current) adapter to plug into a wall outlet. Such AC power can be renewable energy (e.g., solar power). In one embodiment, power source 852 includes only DC power, which can be provided by a DC power source, such as an external AC to DC converter. In one embodiment, power source 852 includes wireless charging hardware to charge via proximity to a charging field. In one embodiment, power source 852 can include an internal battery, AC-DC converter at least to receive alternating current and supply direct current, renewable energy source (e.g., solar power or motion based power), or the like Memory subsystem 860 includes memory device(s) 862 for storing information in device 800. Memory subsystem 860 can include nonvolatile (state does not change if power to the memory device is interrupted) and/or volatile (state is indeterminate if power to the memory device is interrupted) memory devices. Memory devices 862 can store application data, user data, music, photos, documents, or other data, as well as system data (whether long-term or temporary) related to the execution of the applications and functions of device 800. In one embodiment, memory subsystem 860 includes memory controller 864 (which could also be considered part of the control of device 800, and could potentially be considered part of processor 810). Memory controller 864 includes a scheduler to generate and issue commands to memory device 862. In one embodiment, system 800 further includes an asymmetric memory management circuitry 861 to implement one or more of the embodiments described herein. In one embodiment, the asymmetric memory management circuitry 861 is on the same package as the processor. The asymmetric memory management circuitry 861 includes I/O circuitry 833, a cache controller 835, and a traffic controller 837 in accordance with embodiments herein.

Connectivity 870 includes hardware devices (e.g., wireless and/or wired connectors and communication hardware) and software components (e.g., drivers, protocol stacks) to enable device 800 to communicate with external devices. The external device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Device 800 can be powered by a battery, wireless charging, a renewal energy source (e.g., solar power), or when connected to a wall outlet.

Some embodiments are described below. In one embodiment, memory management circuitry includes input/output (I/O) circuitry coupled with a first memory and a second memory, the I/O circuitry to receive memory access requests. The memory management circuitry includes logic to determine if the memory access requests are to a first region of system memory or a second region of system memory, wherein data in the first region is cacheable in a cache of the first memory, and in response to a determination that one of the memory access requests is to the first region and a second of the memory access requests is to the second region, access the data in the first region from the cache of the first memory and concurrently access second data in the second region from the second memory.

In one embodiment, the first region includes a cacheable portion of a page in the system memory, and the second region comprises a non-cacheable portion of the page in the system memory. In one such embodiment, the logic is to only cache data located in cacheable portions of pages in the system memory. In one embodiment, the first memory has a first bandwidth and the second memory has a second bandwidth, and a ratio of the size of the first region to the size of the second region is proportional to a ratio of the first bandwidth to the second bandwidth. In one embodiment, the first memory and the second memory each have separate interfaces to transmit and receive data. In one such embodiment, the logic is to concurrently access the data in the first region via the interface of the first memory and the second data in the second region via the interface of the second memory.

In one embodiment, the logic is to concurrently access the first and second data at a bandwidth that is greater than a bandwidth of the first memory and the second memory individually. In one embodiment, the logic is to allocate a portion of the first memory to the cache and a remaining portion of the first memory to the system memory. In one such embodiment, the system memory includes capacity from both the first memory and the second memory, and the logic is to access data in a region of the system memory mapped to the first memory and concurrently access data in a region of the system memory mapped to the second memory. In one embodiment, the first memory includes an in-package memory in a same package as a processor and the second memory includes an off-package memory in a separate package from the processor.

In one embodiment, a system includes a processor communicatively coupled with a first memory and a second memory, and logic communicatively coupled with the processor and with the first memory and the second memory. The logic is to determine if the memory access requests are to a first region of system memory or a second region of system memory, wherein data in the first region is cacheable in a cache of the first memory, and in response to a determination that one of the memory access requests is to the first region and a second of the memory access requests is to the second region, access the data in the first region from the cache of the first memory and concurrently access second data in the second region from the second memory. In one embodiment, the system further includes any of a display communicatively coupled to the processor, a network interface communicatively coupled to the processor, or a battery coupled to provide power to the system.

In one embodiment, a method involves receiving memory access requests, determining whether the memory access requests are for data in a first region of system memory or second data in a second region of system memory, and in response to determining that one of the memory access requests is to the first region and a second of the memory access requests is to the second region, accessing the data in the first region from a cache of a first memory and concurrently accessing the second data in the second region from a second memory. In one such embodiment, the first region includes a cacheable portion of a page in the system memory, and the second region comprises a non-cacheable portion of the page in the system memory; and only data located in cacheable portions of pages in system memory is cached.

In one embodiment, the first memory and the second memory each have separate interfaces to transmit and receive data; and the method involves concurrently accessing the data in the first region via the interface of the first memory and the second data in the second region via the interface of the second memory. In one embodiment, accessing involves accessing the data at a bandwidth that is greater than a bandwidth of the first memory and the second memory individually. In one embodiment, the method further involves allocating a portion of the first memory to the cache and a remaining portion of the first memory to system memory. In one embodiment, the system memory includes capacity from both the first memory and the second memory, and the method further involves wherein the accessing data in a region of system memory mapped to the first memory and concurrently accessing data in a region of system memory mapped to the second memory.

In one embodiment, memory management circuitry coupled with a first memory and a second memory includes means to receive memory access requests, and means to determine if the memory access requests are to a first region of system memory or a second region of system memory, wherein data in the first region is cacheable in a cache of the first memory, and in response to a determination that one of the memory access requests is to the first region and a second of the memory access requests is to the second region, access the data in the first region from the cache of the first memory and concurrently access second data in the second region from the second memory.

In one embodiment, a memory management circuitry includes input/output (I/O) circuitry coupled with a first memory and a second memory, the I/O circuitry to receive memory access requests, and logic to allocate at least a portion of the first memory and a portion the second memory to a high bandwidth region of system memory. In response to receipt of memory access requests for data in the high bandwidth region, the logic is to access a portion of the data from the first memory and concurrently access a second portion of the data from the second memory. In one embodiment, the first memory and the second memory each have a separate interface to transmit and receive data. In response to receipt of the memory access requests, the logic is to concurrently access the portion of the data in the first region via the interface of the first memory and second portion of the data in the second region via the interface of the second memory. In one such embodiment, the logic is to access data at a bandwidth that is greater than a bandwidth of the first memory and the second memory individually. In one embodiment, a remaining portion of the first memory that is not allocated to the high bandwidth region is allocated to system memory. In one embodiment, the logic is to allocate at least a portion of the second memory to a high bandwidth region. In one such embodiment, the high bandwidth region is defined based on a register setting.

In one embodiment, a method includes allocating a portion of a first memory and a portion of a second memory to a high bandwidth region of system memory, receiving memory access requests for data in the high bandwidth region, and accessing a portion of the data from the first memory and concurrently accessing a second portion of the data from the second memory. In one embodiment, the first memory and the second memory each have a separate interface to transmit and receive data, and in response to receipt of the memory access requests, the accessing involves concurrently accessing the portion of the data in the first region via the interface of the first memory and second portion of the data in the second region via the interface of the second memory. In one embodiment, the accessing is at a bandwidth that is greater than a bandwidth of the first memory and the second memory individually. In one embodiment, the method further includes allocating a remaining portion of the first memory that is not allocated to the high bandwidth region to system memory. In one embodiment, the method involves allocating at least a portion of the second memory to a high bandwidth region. In one embodiment, the high bandwidth region is defined based on a register setting.

In one embodiment, a memory management circuitry coupled with a first memory and a second memory includes means to receive memory access requests, means to allocate at least a portion of the first memory and a portion the second memory to a high bandwidth region of system memory, and in response to receipt of memory access requests for data in the high bandwidth region, means to access a portion of the data from the first memory and concurrently access a second portion of the data from the second memory.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense.

What is claimed is:

1. A memory management circuitry comprising: input/output (1/O) circuitry coupled with an in-package memory in a same package as a processor and an off-package memory in a package separate from the processor, the 1/O circuitry to receive a request to access data stored in the off-package memory; and hardware logic to: copy a part of the data to the in-package memory, wherein the size of the part of the data copied to the in-package memory is based on the in-package memory's bandwidth relative to the off-package memory's bandwidth, wherein the in-package memory's bandwidth is greater than or equal to the off-package memory's bandwidth; and in response to a subsequent request to access the data, concurrently access the part of the data from the in-package memory and a remaining part of the data from the off-package memory.

2. The memory management circuitry of claim 1, wherein:
   the in package memory has a first bandwidth and the off-package memory has a second bandwidth, and
   wherein a ratio of the size of the part of the data copied to the in-package memory to the size of the remaining part of the data is proportional to a ratio of the first bandwidth to the second bandwidth.

3. The memory management circuitry of claim 1, wherein:
   the in package memory and the off-package memory each have separate interfaces to transmit and receive data; and wherein, the logic is to concurrently access the part of the data copied to the in-package memory via the interface of the in package memory and the remaining part of the data via the interface of the off-package memory.

4. The memory management circuitry of claim 1, wherein the logic is to:
concurrently access the part of the data copied to the in-package memory and the remaining part of the data at a bandwidth that is greater than a bandwidth of the in package memory and the off-package memory individually.

5. The memory management circuitry of claim 1, wherein:
the hardware logic is to:
allocate a region of the in package memory to a cache and a remaining region of the off-package memory to system memory.

6. A system comprising:
a processor communicatively coupled with an in-package memory in a same package as the processor and an off-package memory in a package separate from the processor; and
hardware logic communicatively coupled with the processor and with the in-package memory and the off-package memory, wherein the hardware logic is to:
copy a part of data to the in-package memory, wherein the size of the part of the data copied to the in-package memory is based on the in-package memory's bandwidth relative to the off-package memory's bandwidth, wherein the in-package memory's bandwidth is greater than or equal to the off-package memory's bandwidth; and
in response to a subsequent request to access the data, concurrently access the part of the data from the in-package memory and a remaining part of the data from the off-package memory.

7. The system of claim 6, wherein:
the in package memory has a first bandwidth and the off-package memory has a second bandwidth, and
wherein a ratio of the size of the part of the data copied to the in-package memory to the size of the remaining part of the data is proportional to a ratio of the first bandwidth to the second bandwidth.

8. The system of claim 6, wherein:
the in package memory and the off-package memory each have separate interfaces to transmit and receive data; and
wherein the logic is to concurrently access the part of the data copied to the in-package memory via the interface of the in package memory and the remaining part of the data via the interface of the off-package memory.

9. The system of claim 6, wherein the logic is to:
concurrently access the part of the data copied to the in-package memory and the remaining part of the data at a bandwidth that is greater than a bandwidth of the in package memory and the off-package memory individually.

10. The system of claim 6, wherein:
The hardware logic is to:
allocate a region of the in package memory to the cache and a remaining region of the in package memory to system memory.

11. The system of claim 6, further comprising:
any of a display communicatively coupled to the processor, a network interface communicatively coupled to the processor, or a battery coupled to provide power to the system.

12. A method comprising:
receiving a memory access request to access data stored in system memory, system memory including regions from both an in-package memory in a same package as a processor and an off-package memory in a package separate from the processor;
copying a part of the data to the in-package memory, wherein the size of the part of the data copied to the in-package memory is based on the in-package memory's bandwidth relative to the off-package memory's bandwidth, wherein the in-package memory's bandwidth is greater than or equal to the off-package memory's bandwidth; and
in response to a subsequent request to access the data, concurrently accessing the part of the data from the in-package memory and a remaining part of the data from the off-package memory.

13. The method of claim 12, wherein:
the in package memory has a first bandwidth and the off-package memory has a second bandwidth; and
a ratio of the size of the part of the data copied to the in-package memory to the size of the remaining part of the data is proportional to a ratio of the first bandwidth to the second bandwidth.

14. The method of claim 12, wherein:
the in package memory and the off-package memory each have separate interfaces to transmit and receive data; and
wherein the method comprises concurrently accessing the part of the data copied to the in-package memory via the interface of the in package memory and the remaining part of the data via the interface of the off-package memory.

15. The method of claim 12, wherein the accessing comprises:
accessing the data at a bandwidth that is greater than a bandwidth of the in package memory and the off-package memory individually.

16. The method of claim 12, further comprising:
allocating a region of the in package memory to a cache and a remaining region of the in package memory to the system memory.

* * * * *